United States Patent [19]
Ishikawa et al.

[11] Patent Number: 5,619,403
[45] Date of Patent: Apr. 8, 1997

[54] MULTI-OUTPUT POWER SUPPLY APPARATUS

[75] Inventors: Tadashi Ishikawa, Tokyo; Atsushi Asayama, Inagi, both of Japan

[73] Assignee: Canon Kabushiki Kaisha, Tokyo, Japan

[21] Appl. No.: 93,627

[22] Filed: Jul. 20, 1993

[30]     Foreign Application Priority Data

Jul. 24, 1992   [JP]   Japan ................................. 4-197939
Oct. 2, 1992    [JP]   Japan ................................. 4-264770

[51] Int. Cl.$^6$ ............................................. H02M 3/335
[52] U.S. Cl. .................. 363/21; 363/89; 363/97; 363/131
[58] Field of Search ............................ 363/20, 210, 84, 363/89, 95, 97, 131

[56]            References Cited

U.S. PATENT DOCUMENTS

| | | | |
|---|---|---|---|
| 4,642,743 | 2/1987 | Radcliffe | 363/21 |
| 4,833,582 | 5/1989 | Kupka | 363/21 |
| 4,870,555 | 9/1989 | White | 363/21 |
| 4,912,617 | 3/1990 | Hartmann et al. | 363/21 |
| 4,945,465 | 7/1990 | Marinus et al. | 363/89 |
| 5,285,368 | 2/1994 | Ishikawa | 363/21 |
| 5,289,359 | 2/1994 | Ziermann | 363/21 |
| 5,434,768 | 7/1995 | Jitarv et al. | 363/21 |

*Primary Examiner*—Jeffrey L. Sterrett
*Attorney, Agent, or Firm*—Fitzpatrick, Cella, Harper & Scinto

[57]            ABSTRACT

In a multi-output power supply apparatus including a primary winding and a plurality of secondary windings, the switching operation of the primary winding is controlled in accordance with the output of one of the secondary windings. The switching operation of a switching device for switching the output of another secondary winding is synchronized with the switching operation of the primary winding, or is controlled in accordance with an input voltage for the primary winding.

19 Claims, 22 Drawing Sheets

MULTI-OUTPUT POWER SUPPLY APPARATUS

BACKGROUND OF THE INVENTION

1. Field of the Invention

This invention relates to a power supply apparatus having a plurality of outputs which is suitable as a power supply apparatus for a copier or a printer.

2. Description of the Related Art

In a switching power supply apparatus having a plurality of outputs (hereinafter termed a "multi-output" switching power supply apparatus), in order to stabilize a specific output, a PWM (pulse-width modulation) control circuit determines the "on" period of a switching device of the primary side by performing feedback of the output. Other outputs are controlled by providing a control circuit for the output of a winding of the secondary side, or are output without performing control. For example, when the other outputs have small electric power, the outputs can be easily stabilized by performing a series control using three-terminal regulators or the like. However, when the other outputs have large electric power, a large amount of loss is produced by a series control. Hence, in general, a desired voltage value is obtained by performing chopper control. A magnetic amplifier may also be considered for controlling the other outputs.

(a) However, when performing chopper control, if a DC output is first produced and a chopper-type DC-to-DC converter is provided in the following stage, the number of components increases and the efficiency of the apparatus is reduced. Also when directly chopping the output of a secondary winding, a large amount of loss is produced due to switching.

(b) In a magnetic amplifier, since a saturable reactor is magnetized until a saturated region, a large amount of iron loss is produced in a core material. In addition, since the saturation flux density of a magnetic material generally has a negative temperature coefficient, a very large core is required in order to prevent the phenomenon that at a high temperature and no load, the iron loss of the core increases due to the temperature rise of the core, the temperature of the core thereby rises, the saturation flux density of the core thereby decreases, and therefore voltage control cannot be performed. If the switching frequency is increased for the purpose of providing a small switching power supply apparatus, a dead-angle effect (the phenomenon that an output voltage decreases because the output is hindered for a first predetermined time period of a pulse) caused by the uncontrollable magnetic flux of the saturable reactor and the inductance of the winding increases compared with low-frequency switching. In order to prevent such a phenomenon, it is necessary to reduce the number of turns of the saturable reactor, causing a requirement for a greater core in order to obtain the same saturation flux density. As a result, the merit obtained by high-frequency switching is cancelled. In general, accuracy in a magnetic material (for example, the saturation flux density) is ±20% at most. Hence, a larger core must be used in consideration of worst conditions.

Conventional voltage-resonance-type switching regulators have been widely used as devices for generating a high voltage necessary for chargers of copiers, horizontal deflection of CRT's, and the like. Most of these apparatuses are configured such that power supply for a winding of the primary side of a converter transformer is intermitted by switching means, such as a transistor, an FET (field-effect transistor) or the like, to generate a voltage in proportion to the turns ratio at the secondary side.

SUMMARY OF THE INVENTION

It is an object of the present invention to solve the above-described problems.

It is another object of the present invention to provide a multi-output control power supply apparatus which has a simple configuration and high efficiency.

It is still another object of the present invention to provide a switching regulator in which the maximum output voltage does not depend on the power-supply voltage.

According to one aspect, the present invention which achieves these objectives relates to a multi-output power supply apparatus in which a switching device is provided in series immediately after a stage of rectifying an output other than the output of a main control winding, and the output is controlled by turning on and off the switching device in synchronization with a main control switch. Thus, the switching loss can be minimized, and a control circuit can be configured at low cost.

According to another aspect, the present invention which achieves these objectives relates to a multi-output power supply apparatus in which the low-voltage side of a winding other than a main control winding is switched with a frequency sufficiently lower than the switching frequency of a main control output, and the switching is performed during "off" periods of main switching. Since the output at the low-voltage side is switched with this configuration, it is possible to provide a switch driving circuit having a simple configuration which provides a constant voltage not depending on the input voltage, and which causes a small amount of loss. In addition, since switching is performed during off-periods of main switching, the amount of switching loss is reduced.

According to still another aspect, the present invention which achieves these objectives relates to a multi-output power supply apparatus in which a tap is provided at an output choke coil of a winding other than a main control winding (or a two-winding structure is adopted), and switching is performed between the tap and a common electrode. According to this configuration, the amount of loss is reduced, and the configuration of the circuitry is simplified.

According to still another aspect, the present invention which achieves these objectives relates to a power supply apparatus in which in order to deal with a large-power pulsed load, switching means is provided in series with a secondary winding, and the maximum value of the conductive angle of the switching means is provided with input-voltage dependency. Thus, input-voltage dependency of the maximum output power disappears. According to this configuration, it is possible to improve reliability because of improvement in the power supply circuit and protective characteristics of the load, and to reduce the size and the cost of the apparatus from the viewpoint of thermal design.

More specifically, the multi-output control power supply apparatus of the present invention has any of the following configurations (1)–(5).

(1) A multi-output control power supply apparatus, including a converter transformer including a primary winding and first and second secondary windings, first switching means for intermitting a connection between the primary winding and a power supply thereof, rectifying and smoothing means for rectifying and smoothing the output of the first secondary winding and supplying the resultant output to a first output terminal, PWM (pulse-width modulation) control means for performing a PWM control of the first switching means in accordance with a voltage at the first output terminal, rectifying means for rectifying the output of the second secondary winding, second switching means for intermitting the output of the rectifying means and supplying the resultant output to a second output terminal, synchronism detection means for obtaining a signal synchronized with a pulse generated by the PWM control means from the output of the PWM control means, comparison means for comparing a voltage at the second output terminal with a reference value, and holding means for updating and holding the output of the comparison means in accordance with the output of the synchronism detection means, and for supplying the resultant output to the second switching means as a control signal.

(2) A multi-output control power supply apparatus, including a converter transformer including a primary winding and first and second secondary windings, first switching means for intermitting a connection between the primary winding and a power supply thereof, rectifying and smoothing means for rectifying and smoothing the output of the first secondary winding and supplying the resultant output to a first output terminal, PWM control means for performing a PWM control of the first switching means in accordance with a voltage at the first output terminal, rectifying means for rectifying the output of the second secondary winding and supplying the resultant output to a second output terminal, second switching means for intermitting the low-voltage side of the output of the second secondary winding, synchronism detection means for obtaining a signal synchronized with a pulse generated by the PWM control means from the output of the PWM control means, comparison means for comparing a voltage at the second output terminal with a reference value, and holding means for updating and holding the output of the comparison means in accordance with the output of the synchronism detection means, and for supplying the resultant output to the second switching means as a control signal.

(3) A multi-output control power supply apparatus, including a converter transformer including a primary winding and first and second secondary windings, first switching means for intermitting a connection between the primary winding and a power supply thereof, rectifying and smoothing means for rectifying and smoothing the output of the first secondary winding and supplying the resultant output to a first output terminal, PWM control means for performing a PWM control of the first switching means in accordance with a voltage at the first output terminal, rectifying means connected to one end of the second secondary winding, a choke coil having a tap or two windings for supplying a second output terminal with the output of the rectifying means, second switching means for intermitting a connection between the tap or one end of the two windings and another end of the second secondary winding, comparison means for comparing a voltage at the second output terminal with a reference value, and for supplying the second switching means with an output as a result of the comparison as a control signal, and a flywheel diode connected to another end of the two windings and another end of the second secondary winding.

(4) A multi-output control power supply apparatus, including a converter transformer including a primary winding and first and second secondary windings, first switching means for intermitting a connection between the primary winding and a power supply thereof, rectifying and smoothing means for rectifying and smoothing the output of the first secondary winding and supplying the resultant output to a first output terminal, PWM control means for performing a PWM control of the first switching means in accordance with a voltage at the first output terminal, rectifying means connected to one end of the second secondary winding, a choke coil having two windings for supplying a second output terminal with the output of the rectifying means, second switching means for intermitting a connection between a common connection point of the two-winding choke coil and the rectifying means and another end of the second secondary winding, a flywheel diode connected between an end of the two windings opposite to the side connected to the rectifying means and another end of the second secondary winding, and comparison means for comparing a voltage at the second output terminal with a reference value, and for supplying the second switching means with an output as a result of the comparison as a control signal.

(5) A multi-output power supply apparatus for switching the primary side of a converter transformer and supplying an output from an on-on winding of the secondary side of the converter transformer, including switching means connected in series with the on-on winding, power-supply-voltage detection means for detecting the voltage of a power supply for the converter transformer, and control means for performing an on-off control of the switching means by outputting a control signal whose maximum duty cycle changes in accordance with the output of the power-supply-voltage detection means.

According to the above-described configuration (1), the second switching means operates in synchronization with the first switching means, and is turned on and off with 0 voltage.

According to the above-described configuration (2), the second switching means turns on and off the low-voltage side of the second output in synchronization with the first switching means, and is perfectly turned on and off with 0 voltage.

According to the above-described configurations (3) and (4), the second switching means operates in asynchronously with the first switching means and without an auxiliary power supply.

According to the above-described configuration (5), the switching means is subjected to on-off control by the control signal whose maximum duty cycle changes in accordance with the voltage of a power supply of the converter transformer.

These and other objects, advantages and features of the present invention will become more apparent from the following detailed description of the preferred embodiments taken in conjunction with the accompanying drawings.

DETAILED DESCRIPTION OF THE PREFERRED EMBODIMENTS

First Embodiment

Figure 1:
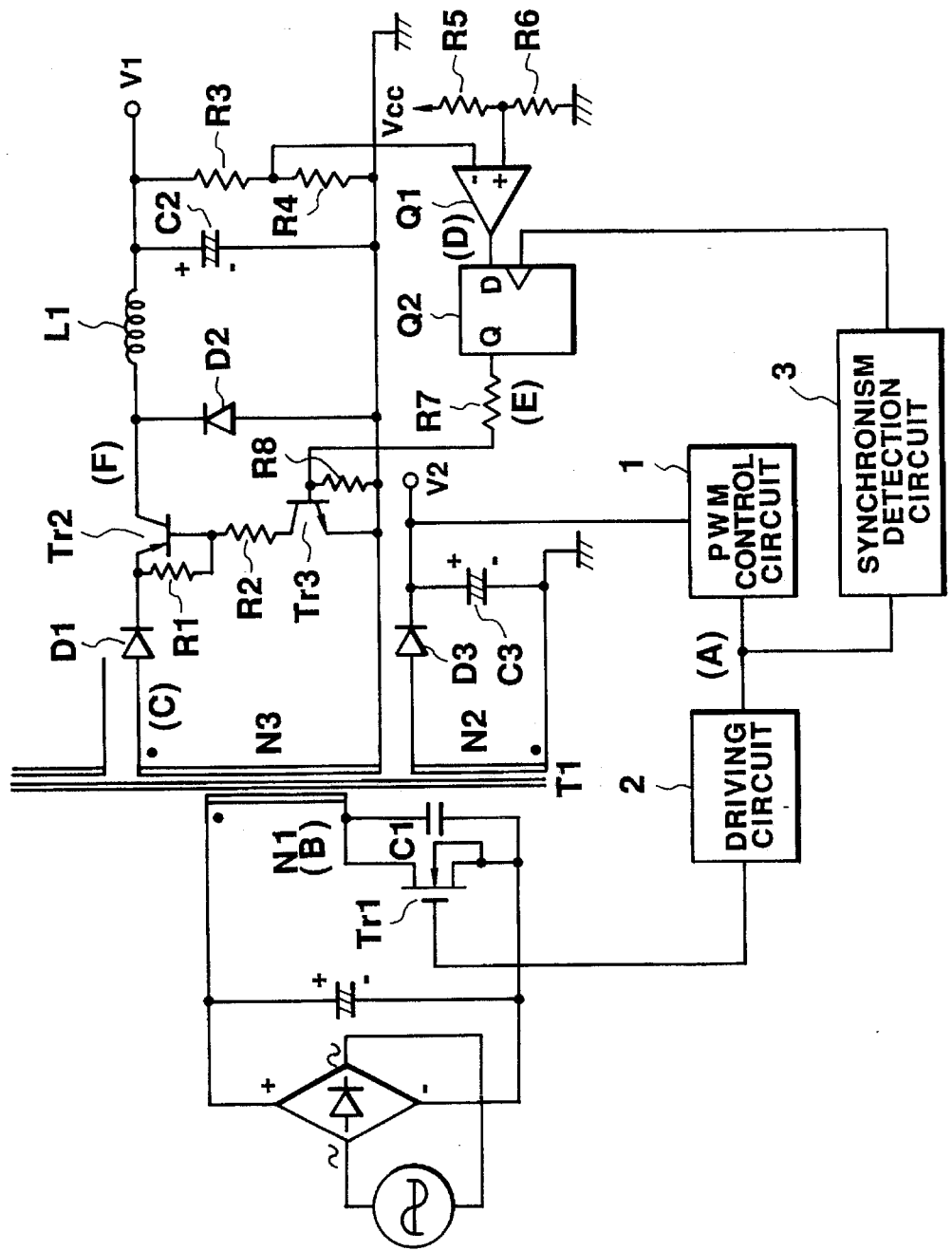
FIG. 1 is a diagram illustrating the circuitry of an apparatus according to a first embodiment of the present invention.

FIG. 1 is a diagram illustrating the circuitry of a multi-output control power supply apparatus according to a first embodiment of the present invention. In FIG. 1, a plus (+) output terminal after rectifying and smoothing an AC line input is connected to one end of winding N1 of the primary side of transformer T1. Another end of winding N1 is connected to the drain of switching transistor (an FET (field-effect transistor) in the present embodiment) Tr1, and the source of FET Tr1 is connected to a minus (−) output terminal after the rectification and smoothing. Resonance capacitor C1 is connected in parallel between the drain and the source of FET Tr1, in order to efficiently transmit electric power to the secondary side of transformer T1 in resonance with the inductance of winding N1. A pulse signal for driving FET Tr1 is generated by PWM control circuit 1, and drives the gate of FET Tr1 via driving circuit 2. In the present embodiment, since PWM control circuit 1 is provided at the secondary side of transformer T1, driving circuit 2 includes insulation means, such as a transformer, a photocoupler or the like. An output from winding N2 of the secondary side of transformer T1 is rectified and smoothed by rectifier diode D3 and capacitor C3 to be output as output V2 and also input to PWM control circuit 1 so as to determine the pulse width. Rectifier diode D3 of winding N2 is connected so as to be turned off and on when FET Tr1 is turned on and off, respectively. That is, rectifier diode D3 and capacitor C3 constitute a flyback converter which drives FET Tr1 so that the output of winding N2 has a predetermined value.

A voltage proportional to the turns ratio of N3 to N1, the input AC line voltage, and the duty ratio of PWM is generated in winding N3 of the secondary side of transformer T1. Winding N3 is connected to that rectifier diode D1 is turned on when FET Tr1 is turned on. The output of winding N3 is rectified by rectifier diode D1 and is supplied to the emitter of switching transistor Tr2. Another end of winding N3 is grounded. The collector of transistor Tr2 is connected to the cathode of flywheel diode D2 and one end of choke coil L1. Another end of choke coil L1 is connected to one end of capacitor C2, and is also output to the outside as output V1. This output V1 is divided by resistors R3 and R4, and the divided output is input to the minus (−) terminal of comparator Q1. A voltage obtained by dividing a known voltage Vcc by resistors R5 and R6 is input to the plus (+) terminal of comparator Q1. The output of comparator Q1 is input to D flip-flop (hereinafter termed a D-F/F) Q2. The output of D-F/F Q2 turns on and off transistor Tr2 via transistor Tr3. A PWM pulse signal from PWM control circuit 1 is input to the clock terminal of D-F/F Q2 via synchronism detection circuit 30. The anode of diode D2, another end of capacitor C2, the emitter of transistor Tr3 and the like are grounded.

In the present embodiment, power is supplied to the respective circuits at the secondary side from another auxiliary power supply (not shown).

Figure 2:
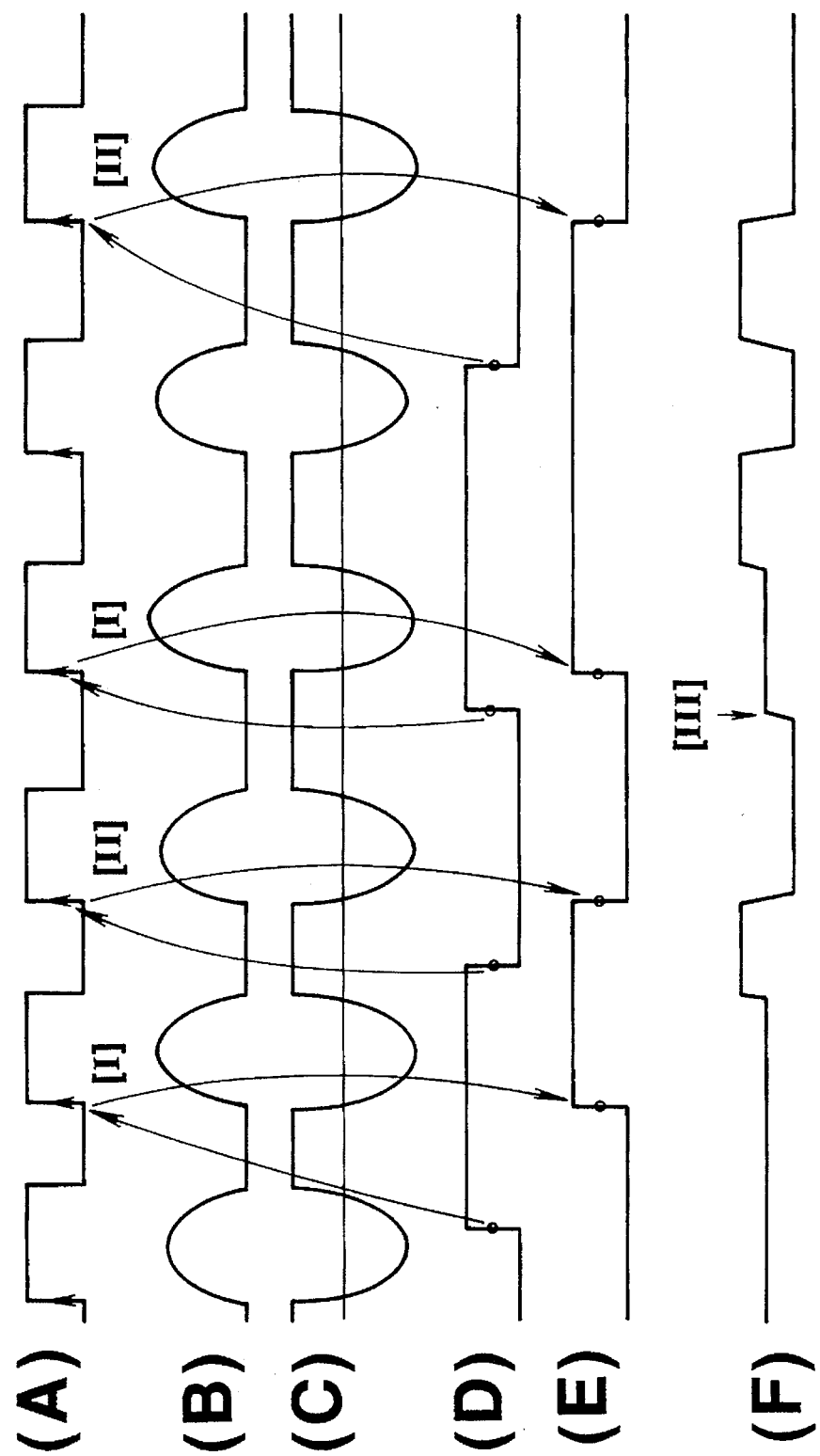
FIG. 2 illustrates timing charts of the first embodiment.

Next, the operation of the present embodiment will be described. FIG. 2 illustrates timing charts of the first embodiment and illustrates waveforms at points (A)–(F) shown in FIG. 1. Chart (A) illustrates the output of PWM control circuit 1, which operates so as to increase and decrease the "on" period (corresponding to level "L") of FET Tr1 when output V2 at the side of winding N2 is smaller and greater than a predetermined value, respectively. While FET Tr1 is turned on, a minus (−) voltage is generated at the ungrounded end of winding N2, and rectifier diode D3 is turned off. Hence, energy is not dissipated through winding N2, and electromagnetic energy is stored in the primary inductance. When FET Tr1 has been turned off, a flyback pulse is generated in winding N1, and the voltage waveform at winding N2 is inverted to turn on rectifier diode D3. Thus, the energy stored in the primary inductance is discharged to the secondary side. The width of the flyback pulse is determined by the primary inductance, resonance capacitor C1 and the capacity of the winding. In order to prevent a switching loss caused by zero-voltage switching in which FET Tr1 is turned on when the voltage waveform assumes a zero level, PWM control circuit 1 operates so as to provide a constant width of the flyback pulse during "off" periods of FET Tr1. That is, a duty controlling operation, in which the pulse width during "on" periods is changed while providing a constant "off" period, is performed.

Chart (B) in FIG. 2 illustrates the waveform of the drain voltage of FET Tr1. Chart (C) illustrates the waveform of winding N3. If rectifier diode D1 is turned on while transistor Tr2 is turned on, energy is supplied to the load via choke coil L1, and capacitor C2 is charged to excite choke coil L1. If rectifier diode D1 is then turned off, flywheel diode D2 is turned on, and the exciting energy stored in choke coil L1 and the charging energy of capacitor C2 are supplied to the load. A normal forward conversion operation, in which the above-described operation is repeated in accordance with the on/off states of FET Tr1, is performed.

While transistor Tr2 is turned off, energy is not supplied from transformer T1 irrespective of the voltage waveform generated in winding N3. Hence, the energy stored in choke coil L1 and capacitor C2 is continuously supplied to the load. Output voltage V1 at the side of winding N3 is divided by resistors R3 and R4, and the divided voltage is connected to the minus (−) input terminal of comparator Q1. Comparator Q1 compares the divided voltage of the voltage V1 with a reference voltage obtained by dividing the known voltage Vcc by resistors R5 and R8 and supplied to the plus (+) input terminal of comparator Q1. The output terminal of comparator Q1 is connected to the D input terminal of D-F/F Q2, the Q output terminal of D-F/F Q2 is connected to the base of transistor Tr3, and the collector of transistor Tr3 is connected to the base of transistor Tr2. Transistor Tr2 is turned on and off by the output of D-F/F Q2. The output of PWM control circuit 1 is input to the clock terminal of D-F/F Q2 via synchronism detection circuit 3.

For example, a case, in which a clock signal is provided by detecting the rising edge of a pulse shown in Chart (A), will be described. As described above, FET Tr1 is turned on while the output of PWM control circuit 1 assumes level "L", and a plus (+) voltage is generated in winding N3. If the detected value of voltage V1 is smaller than a predetermined value, comparator Q1 outputs level "H". This result of the comparison is latched by D-F/F Q2 by the rising edge shown in Chart (A) (corresponding to portion (I) in FIG. 2), transistor Tr2 is turned on by this latch. At that time, transistor Tr2 is already turned off, and winding N3 generates a minus (−) voltage. Hence, rectifier diode D1 is turned off, and current does not flow through transistor Tr2. That is, basically, the transition of transistor Tr2 is effected when voltage is not applied to the emitter of transistor Tr2. If transistor Tr2 is again turned on and a plus (+) voltage is generated in winding N3, current flows through transistor Tr2. Thus, current is supplied to the load, and choke coil L1 is excited to charge capacitor C2. If FET Tr1 is then turned off, the voltage waveform of winding N3 is inverted, and rectifier diode D1 is turned off. As a result, current supply via transistor Tr2 is interrupted to turn on flywheel diode D2, whereby the exciting energy stored in choke coil L1 and the charging energy of capacitor C2 are supplied to the load. The above-described forward conversion operation is repeated while the detected value of output voltage V1 at the side of winding N3 is smaller than the predetermined value.

When the detected value of output voltage V1 has reached the predetermined value, the output of comparator Q1 is inverted. As a result, the output is delayed until the output of PWM control circuit 1 rises, and is latched in DF/F Q2 (corresponding to portion [II] shown in FIG. 2). Transistor Tr2 is turned off by this result of the latch. At that time, FET Tr1 is already turned off, and winding N3 turns off transistor Tr2 while generating a minus (−) voltage. That is, since the transition of transistor Tr2 occurs when no voltage is applied to its emitter, no switching loss is produced. As a result, a very efficient regulator can be configured. When transistor Tr2 has been turned off, flywheel diode D2 is turned on as in the above-described forward conversion operation. Hence, the exciting energy stored in choke coil L1 and the charging energy of capacitor C2 are supplied to the load. When all the exciting energy stored in choke coil L1 has been discharged, the voltage at point (F) assumes the same potential as output voltage V1 to turn off flywheel diode D2 (corresponding to portion [III] shown in FIG. 2), and only the charging energy of capacitor C2 is discharged to the load, causing a gradual decrease in the output voltage. When the value of the output voltage becomes smaller than the set value of comparator Q1, the output of comparator Q1 is inverted to again turn on transistor Tr2, and the above-described operation is repeated.

Figure 18:
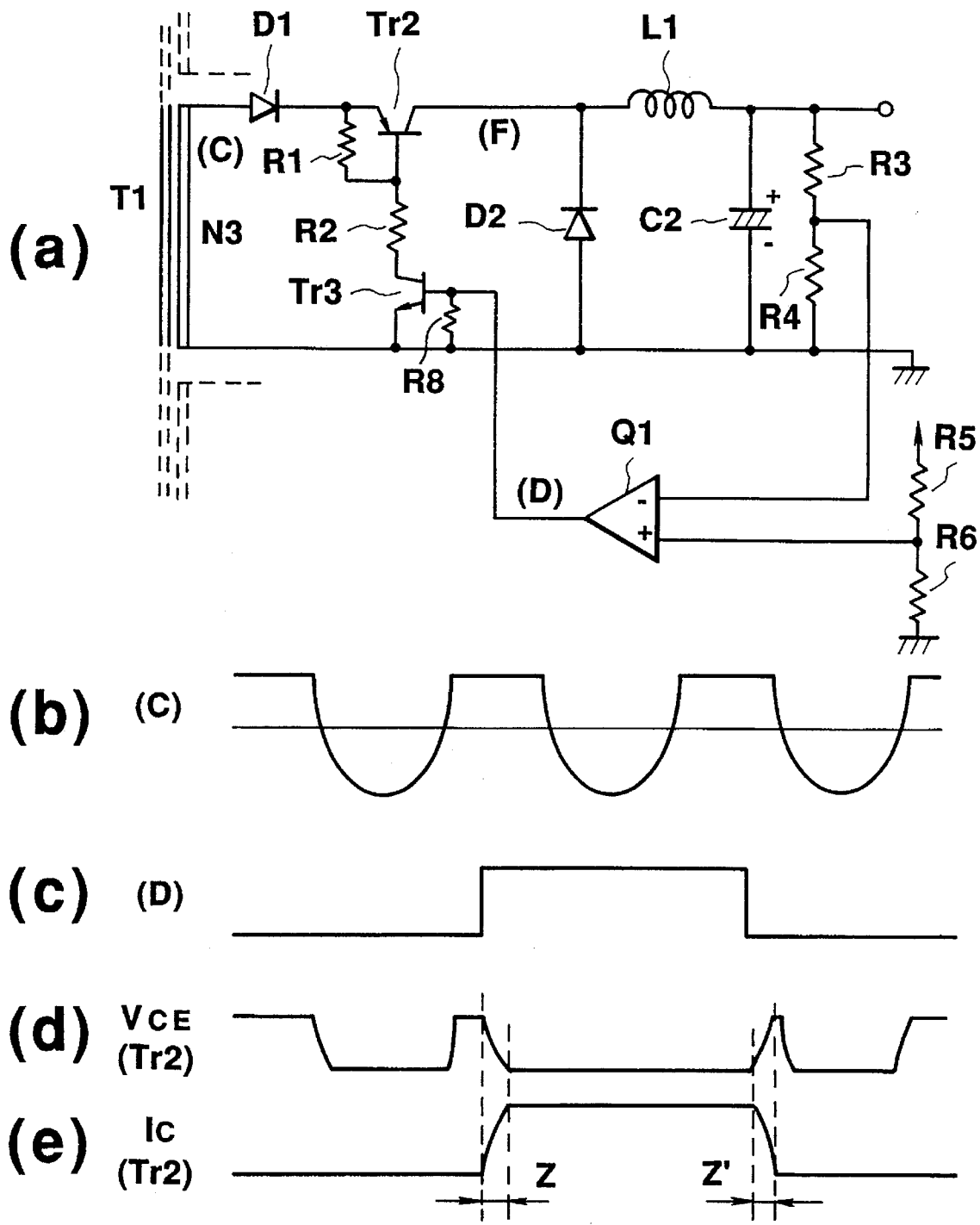
FIG. 18 illustrates diagrams illustrating a conventional approach.

FIG. 18 illustrates a conventional approach. In this approach, transistor Tr2 is instantaneously switched by the result of comparison. Hence, as shown in the timing charts of FIG. 18, a switching loss is produced in switching transistor Tr2 during time periods Z and Z' when switching transistor Tr2 is turned on and off. Particularly, a large-current switching transistor tends to have a slow switching time, causing a large amount of loss. To the contrary, as described above, according to the present embodiment, the efficiency of the apparatus is improved with a simple configuration.

Although in the present embodiment, a description has been provided using a bipolar transistor as switching transistor Tr2, any other device may be used provided that it can perform a switching operation. For example, an FET may be used.

Second Embodiment

Figure 3:
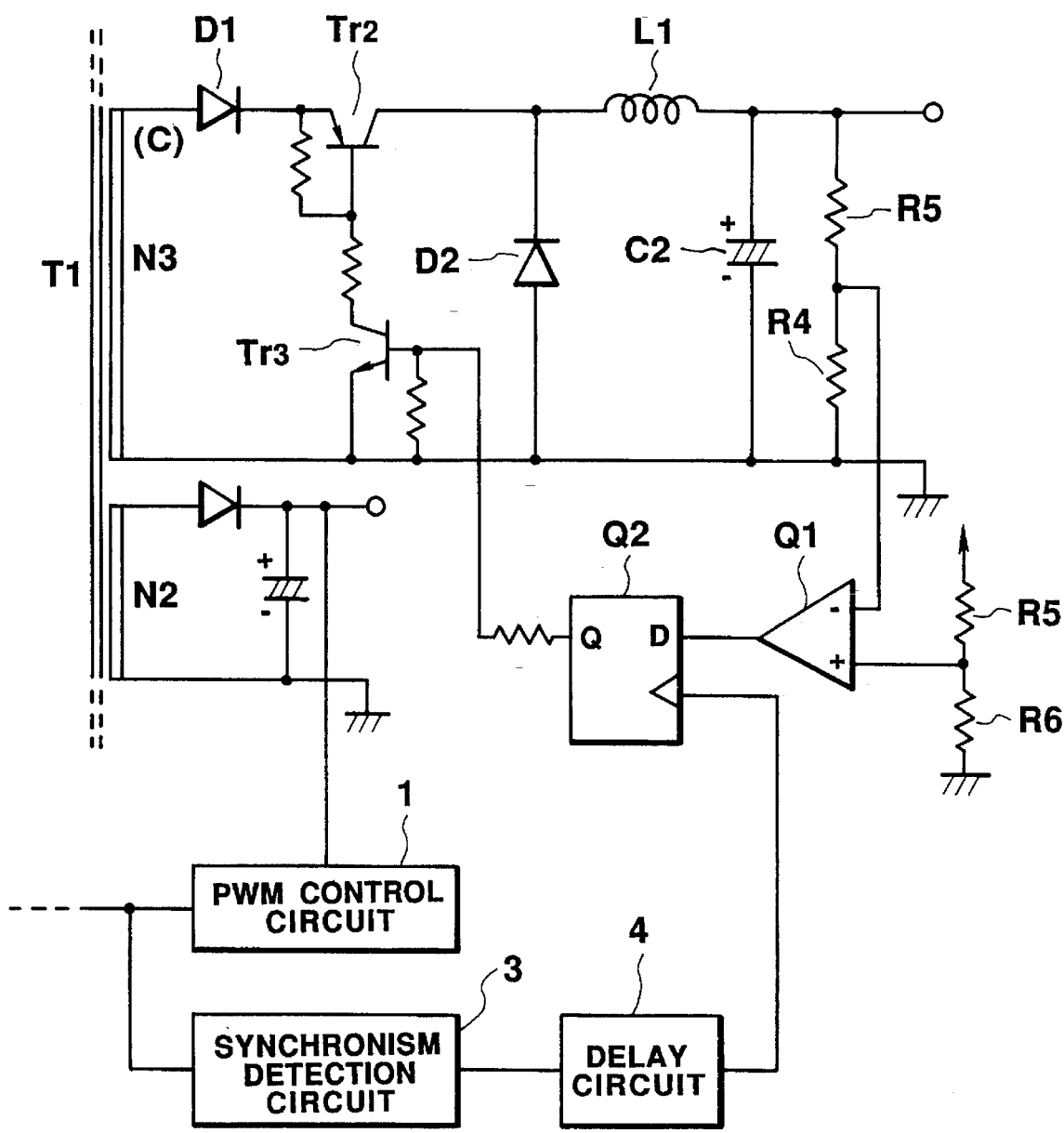
FIG. 3 is a diagram illustrating the circuitry of a principal portion of an apparatus according to a second embodiment of the present invention.

FIG. 3 illustrates the circuitry of a principal portion of an apparatus according to a second embodiment of the present invention. In the first embodiment, a clock signal for D-F/F Q2 is obtained by performing synchronism detection from the output of PWM control circuit 1. In the present embodiment, however, as shown in FIG. 3, delay circuit 4 is provided at the following stage of synchronism detection circuit 3, and a clock signal is supplied to D-F/F Q2 via this circuit.

As described in the first embodiment, the output of PWM control circuit 1 drives the transistor at the primary side via driving circuit 2 as well as the transformer, causing the generation of an output waveform in the winding at the secondary side. Hence, a considerable amount of delay is in some cases present between the output of PWM control circuit 1 and the output waveform of winding N2 of the secondary side. Moreover, if the output of PWM control circuit 1 is directly made to be a clock signal for D-F/F Q2 as in the first embodiment, there is the possibility that switching transistor Tr2 is switched while a plus (+) voltage is generated in winding N3, depending on the switching time of switching transistor Tr2. By providing an appropriate amount of delay to the output of PWM control circuit 1 by delay circuit 4 and making the resultant output a clock signal for D-F/F Q2, a configuration in which a switching loss is not produced can be provided even in the above-described case.

Third Embodiment

Figure 4:
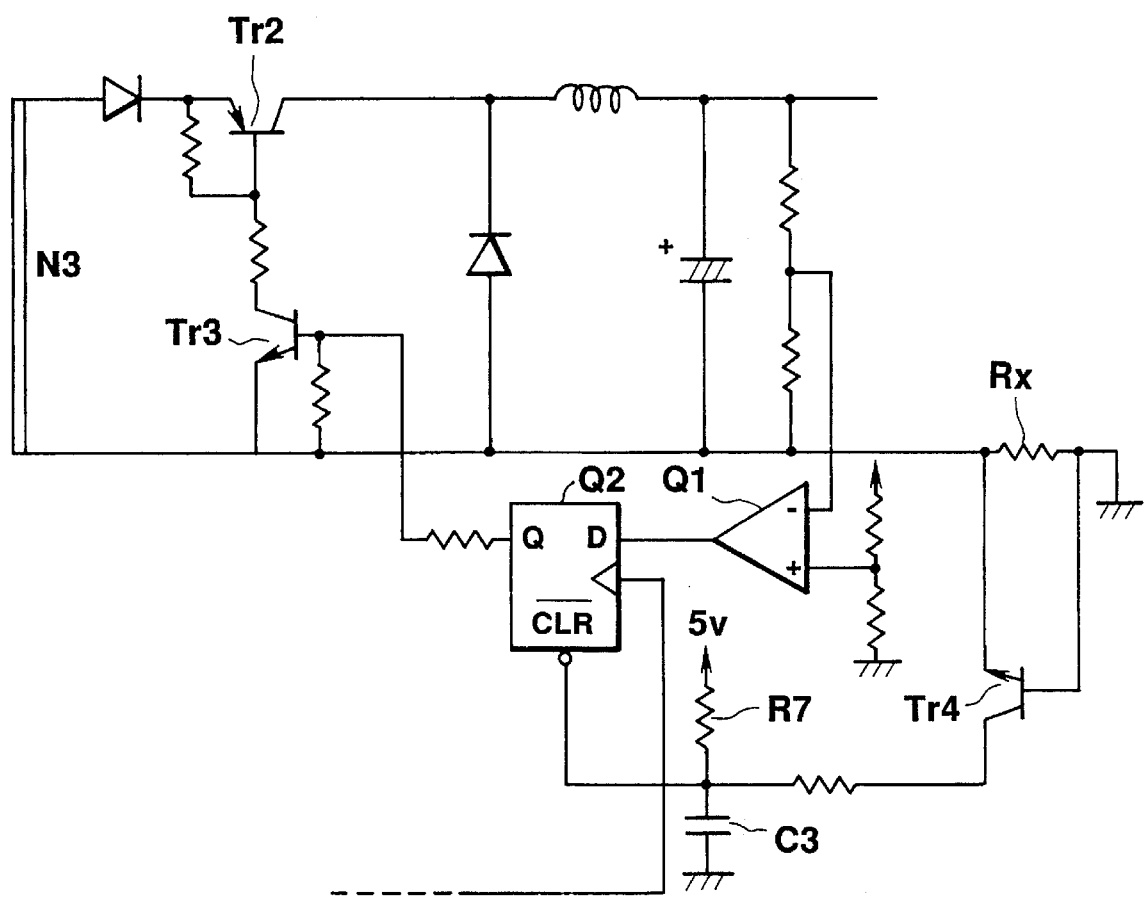
FIG. 4 is a diagram illustrating the circuitry of a principal portion of an apparatus according to a third embodiment of the present invention.

FIG. 4 is a diagram illustrating the circuitry of a principal portion of an apparatus according to a third embodiment of the present invention. In the present embodiment, resistor Rx detects the output current. When the voltage drop in resistor Rx exceeds the value Vbe of transistor Tr4, transistor Tr4 is turned on to forcedly make the clear terminal of D-F/F Q2 level "L". As a result, transistor Tr2 is turned on to interrupt energy supply from winding N3 to the load. Thus, overcurrent protection can be realized. An idle period corresponding to the time constant determined by resistor R7 and capacitor C3 is set.

Fourth Embodiment

Figure 5:
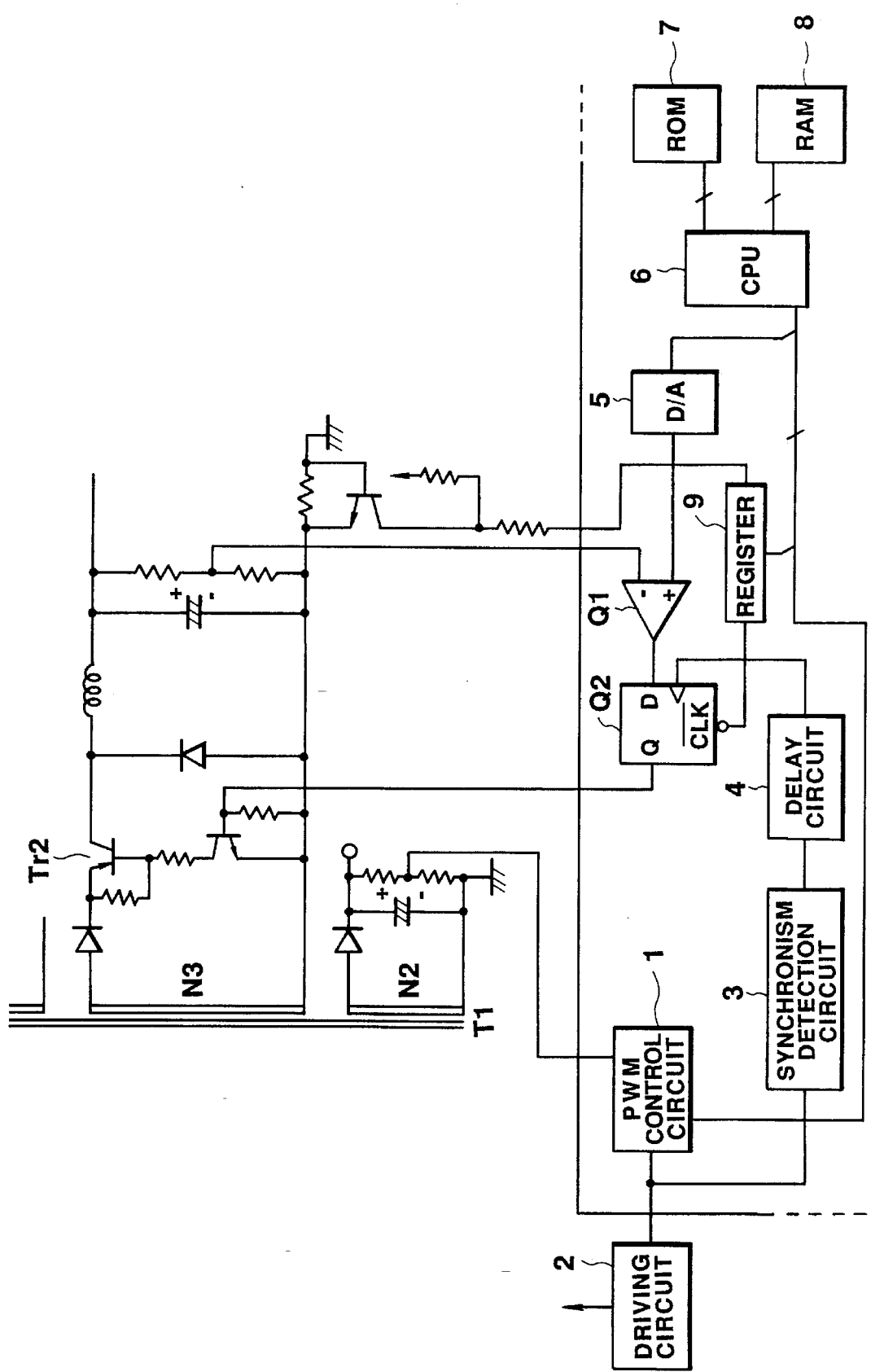
FIG. 5 is a diagram illustrating the circuitry of a principal portion of an apparatus according to a fourth embodiment of the present invention.

FIG. 5 is a diagram illustrating the circuitry of a principal portion of an apparatus according to a fourth embodiment of the present invention. As shown in FIG. 5, digital circuitry including CPU 6, ROM 7, RAM 8, a timer and the like, analog circuitry including an A/D converter and the like, and the above-described circuits 1, 3, 4, Q1, Q2 and the like are integrated on one chip. It is thereby possible to perform power-supply control suitable for each state while performing sequential control of a copier, a printer or the like. For example, delay circuit 4 may be configured by a programmable counter. Thus, even if the delay in the generation of a voltage waveform in the emitter of transistor Tr2 after PWM control circuit 1 has generated a pulse in a loaded condition changes, since CPU 6 has information relating to the loaded condition, the loss in transistor Tr2 can be minimized by setting an optimum value in the programmable counter. In addition, by switching the comparison (reference) voltage of comparator Q1 between a steady state and a quiescent state, low power consumption can be realized. Furthermore, CPU 6 may deal with overcurrent protection via set/reset register 9, and reset register 9. Thus, an idle period can be arbitrarily set by CPU 6. As described above, by integrating various circuit components on one chip, it is possible to perform flexible and intelligenter power-supply control.

Fifth Embodiment

In the above-described first through fourth embodiments, switching loss is reduced by turning on and off switching transistor Tr2 with zero voltage. However, since the base current of switching transistor Tr2 is obtained from the output of winding N3 whose output is chopped, the turning-on of the switching transistor with zero voltage cannot be performed from the viewpoint of principle. The following fifth through seventh embodiments of the present invention intend to solve this problem.

Figure 6:
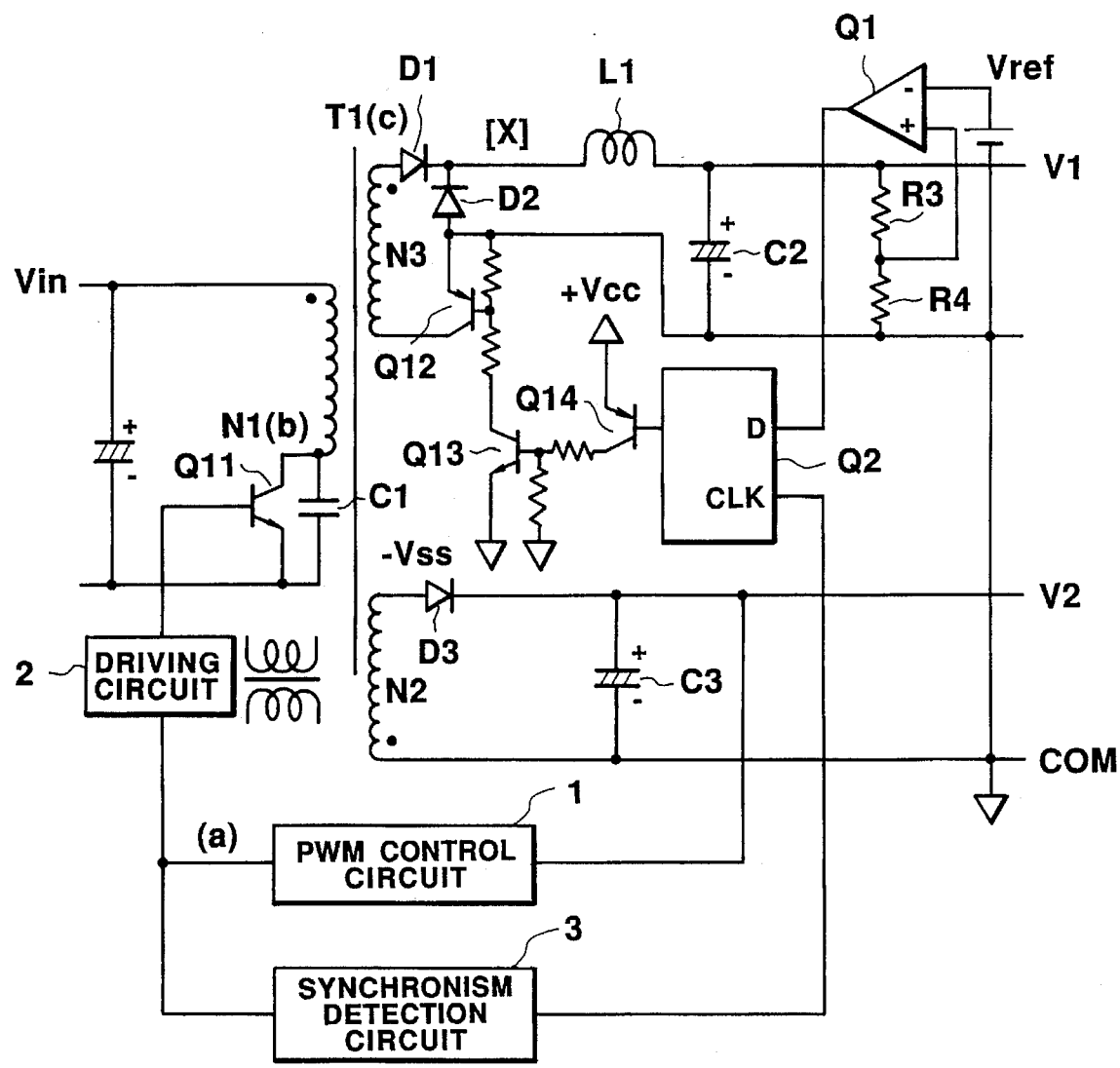
FIG. 6 is a diagram illustrating the circuitry of an apparatus according to a fifth embodiment of the present invention.

FIG. 6 is a diagram illustrating the circuitry of a "multi-output control power supply apparatus" according to a fifth embodiment of the present invention.

A plus (+) output after rectifying and smoothing an AC line input is supplied to one end of winding N1 of the primary side of transformer T1. Another end of winding N1 is connected to the collector of switching transistor Q11, and the emitter of transistor Q11 is connected to a minus (-) output terminal after the rectification and smoothing. Resonance capacitor C1 is provided between the collector and the emitter of transistor Q11 in order to efficiently transmit electric power to the secondary side of transformer T1 in resonance with the inductance of winding N1. A pulse signal for driving transistor Q11 is generated by PWM control circuit 1, and drives the base of transistor Q11 via driving circuit 2. In the present embodiment, since PWM control circuit 1 is provided at the secondary side of transformer T1, driving circuit 2 includes insulation means. The output of winding N2 of the secondary side of transformer T1 is rectified and smoothed by diode D3 and capacitor C3 to be output as output V2, and is also input to PWM control circuit 1 so as to determine the pulse width. Rectifier diode D3 of winding N2 is connected so as to be turned off and on when transistor Q11 is turned on and off, respectively. That is, rectifier diode D3 and capacitor C3 constitute a flyback converter which drives transistor Q11 so that the output of winding N2 has a predetermined value.

A voltage proportional to the turns ratio of N3 to N1, the input AC line voltage, and the duty ratio of PWM is generated at winding N3 of the secondary side of transformer T1. This winding N3 is connected so that rectifier diode D1 is turned on when transistor Q11 is turned on. The voltage of winding N3 is rectified b7 rectifier diode D1. The cathode of diode D1 is connected to the cathode of flywheel diode D2 and one end of choke coil L1. Another end of choke coil L1 is connected to one end of capacitor C2, and is also output to the outside as output V1. This output V1 is divided by resistors R3 and R4, and the divided output is input to the plus (+) terminal of comparator Q1. A known voltage Vref is input to the minus (-) terminal of comparator Q1. The output of comparator Q1 is input to D-F/F Q2. The output of D-F/F Q2 turns on and off transistor (to be described later) via transistors Q14 and Q13. A PWM pulse signal from PWM control circuit 1 is input to the clock terminal of D-F/F Q2 via synchronism detection circuit 3.

Another end of winding N3 is connected to the collector of transistor Q12. The emitter of transistor Q12, the anode of diode D2, another end of capacitor C2, and the like are grounded. The emitter of transistor Q13, and the like are connected to a minus power supply -Vss. Power is supplied to the circuits 1, 2, 3, Q1, Q2 and the like of the secondary side from another auxiliary power supply (not shown).

Figure 7:
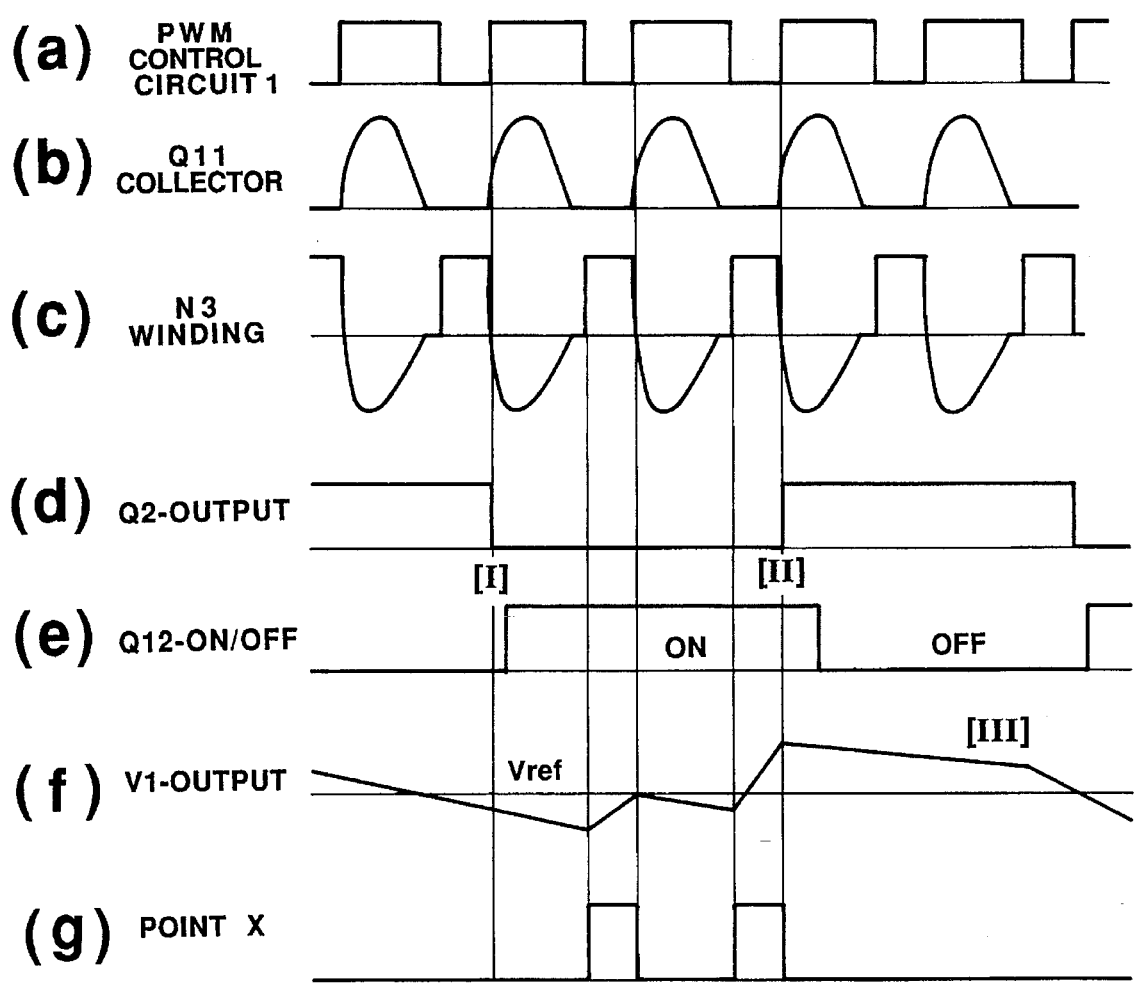
FIG. 7 illustrates timing charts of the fifth embodiment.

Next, the operation of the present embodiment will be described. FIG. 7 illustrates timing charts of the present embodiment. IN FIG. 7, Chart (a) illustrates the output of PWM control circuit 1, which operates so as to increase and decrease the "on" period (corresponding to level "L") of transistor Q11 when output V2 at the side of winding N2 is smaller and greater than a predetermined value, respectively. While transistor Q11 is turned on, a minus (-) voltage is generated in winding N2, and rectifier diode D3 is turned off. Hence, energy is not dissipated through winding N2, and electromagnetic energy is stored in the primary inductance. When transistor Q11 has been turned off, a flyback pulse is generated in winding N1, and the voltage waveform in winding N2 is inverted to turn on rectifier diode D3. Thus, the energy stored in the primary inductance is discharged to the secondary side. The width of the flyback pulse is determined by the primary inductance, resonance capacitor C1 and the capacity of the winding. In order to prevent a switching loss caused by zero-voltage switching in which transistor Q11 is turned on when the voltage waveform assumes a zero level, PWM control circuit 1 operates so as to provide a constant width of the flyback pulse during "off" periods of transistor Q11. That is, an operation, in which the pulse width during "on" periods is changed while providing a constant "off" period, is performed.

Chart (b) in FIG. 7 illustrates the waveform of the collector of transistor Q11. Chart (c) illustrates the waveform of winding N3. If rectifier diode D1 is turned on while transistor Q12 is turned on, energy is supplied to the load via choke coil L1, and capacitor C2 is charged to exite choke coil L1. If rectifier diode D1 is turned off, flywheel diode D2 is turned on, and the exciting energy stored in choke coil L1 and the charging energy of capacitor C2 are supplied to the load. A normal forward conversion operation, in which the above-described operation is repeated in accordance with the on/off states of transistor Q11, is performed. While transistor Q12 is turned off, energy is not supplied from transformer T1 irrespective of the voltage waveform generated in winding N3. Hence, the energy stored in choke coil L1 and capacitor C2 is continuously supplied to the load. Output voltage V1 is divided by resistors R3 and R4, and the divided voltage is supplied to the plus (+) input terminal of comparator Q1. Comparator Q1 compares the above-described voltage with a reference voltage Vref supplied to the minus (−) terminal of comparator Q1. The output of comparator QI is supplied to the D input terminal of D-F/F Q2, the output of D-F/F Q2 is supplied to the base of transistor Q14, the emitter of transistor Q14 is connected to a plus power supply, the collector of transistor Q14 is connected to the base of transistor Q13, and the collector of transistor Q13 is connected to the base of transistor Q12. Transistor Q12 is turned on and off by the output of D-F/FQ2. The output of PWM control circuit 1 is input to the clock terminal of D-F/F Q2 via synchronism detection circuit 3.

For example, a case, in which a clock signal is provided by detecting the rising edge of a pulse shown in Chart (a), will be described. As described above, transistor Q11 is turned on while the output of PWM control circuit 1 assumes level "L", and a plus (+) voltage is generated in winding N3. If the detected value of output voltage V1 is smaller than a predetermined value, comparator Q1 outputs level "L". This result of the comparison is latched by D-F/F Q2 by the rising edge shown in Chart (a) (corresponding to portion (I) in FIG. 7). Switching transistor Q12 is turned on by this latch. At that time, transistor Q11 is already turned off, and winding N3 generates a minus (−) voltage. Hence, rectifier diode D1 is turned off, and current does not flow through transistor Q12. That is, basically, the transition of transistor Q12 is effected when voltage is not applied between the emitter and the collector of transistor Q12. If transistor Q11 is again turned on and a plus (+) voltage is generated in winding N3, current flows through transistor Q12, as shown in Chart (g). Thus, current is supplied to the load, and choke coil L1 is excited to charge capacitor C2. If transistor Q11 is then turned off, the voltage waveform of winding N3 is inverted, and rectifier diode D1 is turned off. As a result, current supply via transistor Q12 is interrupted to turn on flywheel diode D2, whereby the exciting energy stored in choke coil L1 and the charging energy of capacitor C2 are supplied to the load. The above-described forward conversion operation is repeated while the detected value of output voltage V1 at the side of winding N3 is smaller than the predetermined value.

When the detected value of output voltage V1 has reached the predetermined value, the output of comparator Q1 is inverted. As a result, the output is delayed until the output of PWM control circuit 1 rises, and is latched in D-F/F Q2 (corresponding to portion [II] shown in FIG. 7). Switching transistor Q12 is turned off by this result of the latch. At that time, transistor Q11 is already turned off, and winding N3 turns off transistor Q12 while generating a minus (−) voltage. That is, since the transition of transistor Q12 occurs when no voltage is applied between its emitter and collector, no switching loss is produced. As a result, a very efficient regulator can be configured. When transistor Q12 has been turned off, flywheel diode D2 is turned on as in the above-described forward conversion operation. Hence, the exciting energy stored in choke coil L1 and the charging energy of capacitor C2 are supplied to the load. When all the exciting energy stored in choke coil L1 has been discharged, the voltage at point (X) assumes the same potential as the output voltage to turn off flywheel diode D2 (corresponding to portion [III] shown in FIG. 7), and only the charging energy of capacitor C2 is discharged to the load, causing a gradual decrease in the output voltage. When the value of the output voltage becomes smaller than the set value of comparator Q1, the output of comparator Q1 is inverted to again turn on transistor Q12, and the above-described operation is repeated.

In the present embodiment, the base current of switching transistor Q12 is obtained from auxiliary power supply −Vss, and perfect turning-on of the switching transistor with zero voltage can be realized. In addition, since the switching transistor is provided at the low-voltage side, the loss in a base-current-limiting resistor has a small value.

Although in the present embodiment, a description has been provided using a bipolar transistor as switching transistor Q12, any other device may be used provided that it can perform a switching operation. For example, an FET may be used.

Sixth Embodiment

Figure 8:
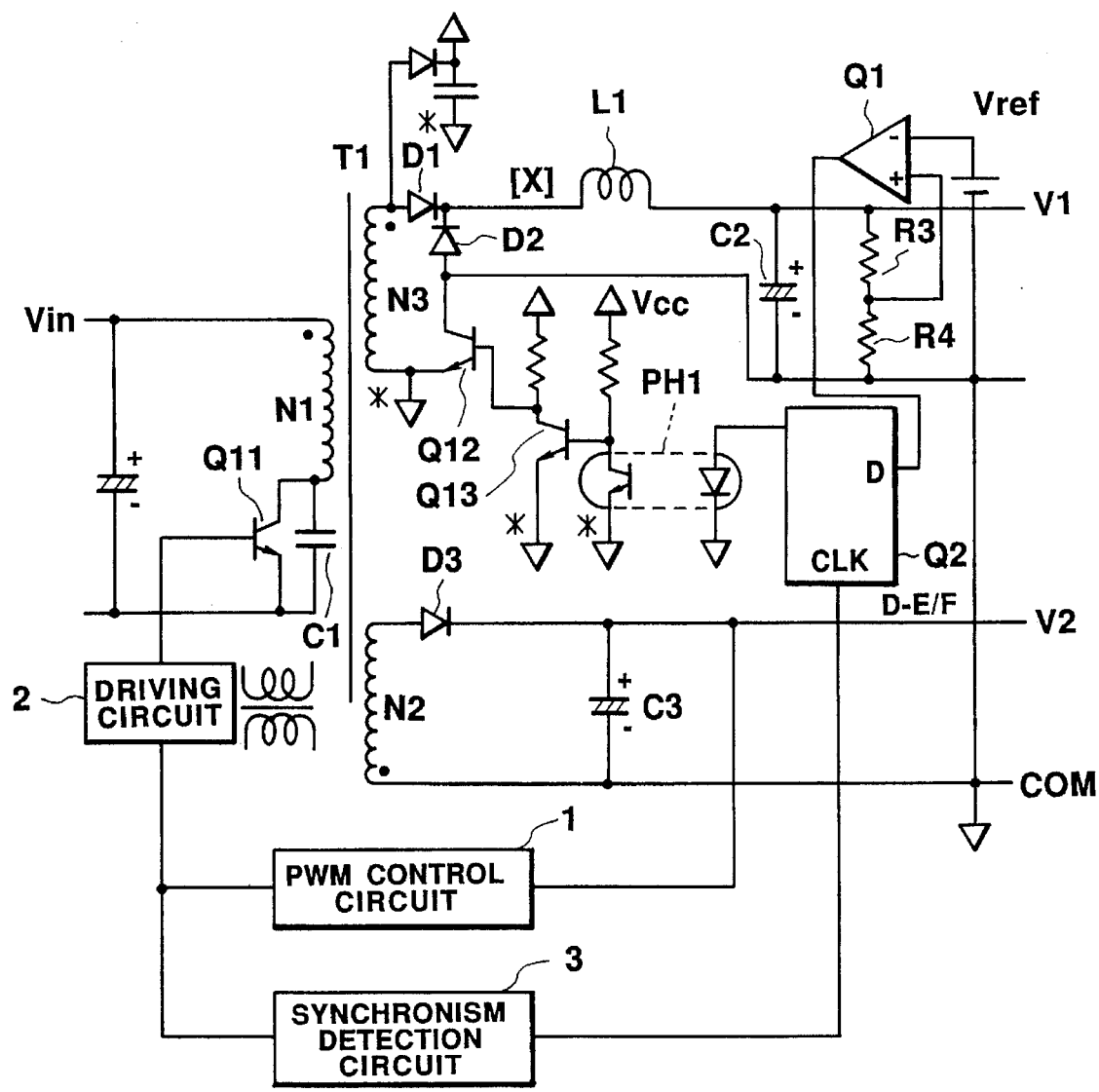
FIG. 8 is a diagram illustrating the circuitry of an apparatus according to a sixth embodiment of the present invention.

FIG. 8 illustrates the circuitry of an apparatus according to a sixth embodiment of the present invention. In the fifth embodiment, a PNP transistor is used as the switching device Q12. However, a PNP transistor is more expensive than an NPN transistor, and is less available. Hence, in the present embodiment, the same function as in the fifth embodiment is obtained by using an NPN transistor and a photocoupler PH1.

Seventh Embodiment

Figure 9:
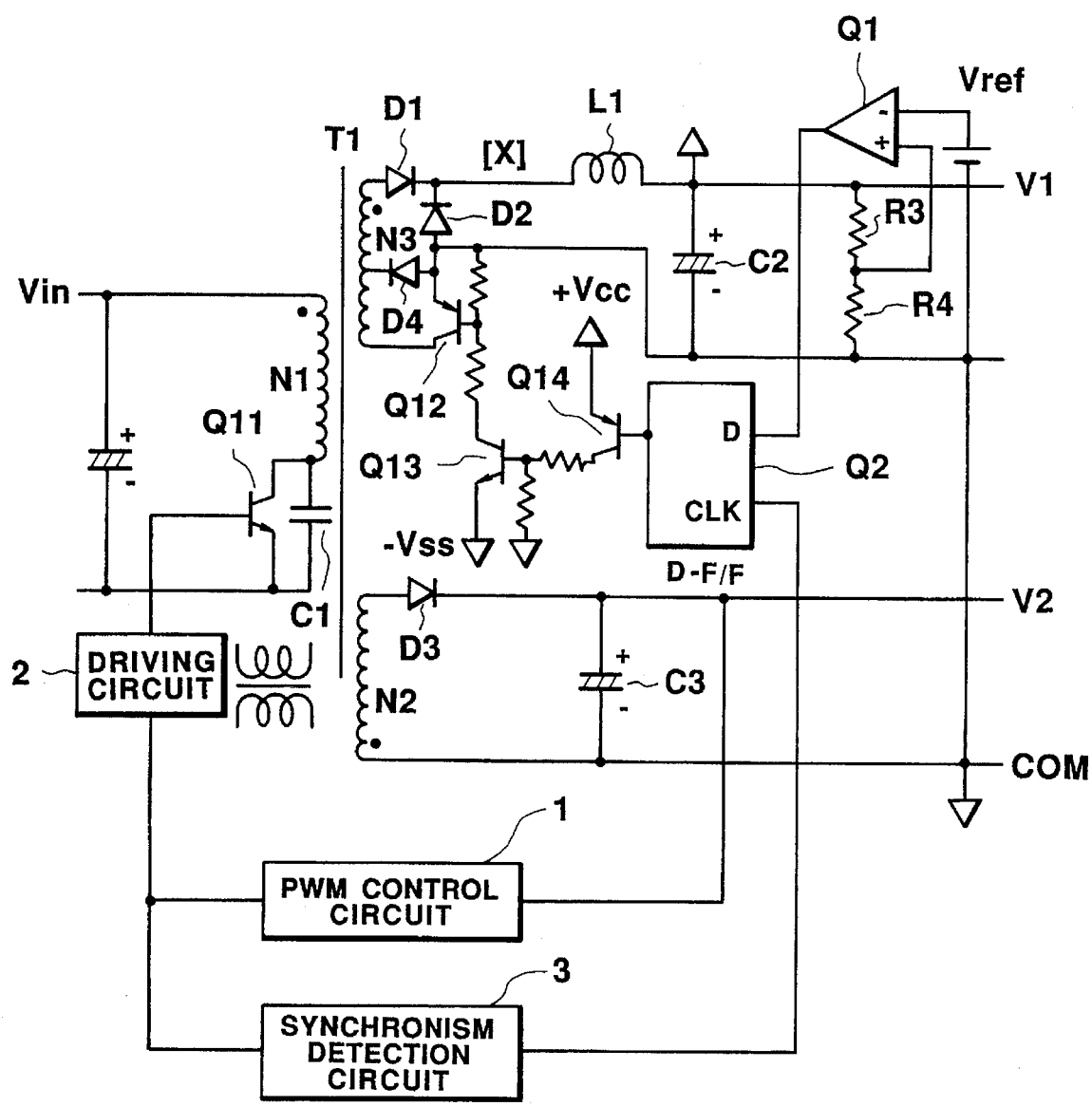
FIG. 9 is a diagram illustrating the circuitry of an apparatus according to a seventh embodiment of the present invention.

FIG. 9 illustrates the circuitry of an apparatus according to a seventh embodiment of the present invention. While an external auxiliary power supply is required in the fifth embodiment, in the present embodiment, by adding diode D4, a certain amount of output voltage VI can be output even if transistor Q12 is turned off at the start point. Hence, this voltage V1 can be used in place of the auxiliary power supply, and therefore the production cost can be reduced.

In the above mentioned first through seventh embodiments, when a power supply needs to provide somewhat large electrical power to a load, such as a motor, from a forward type winding N3 (in FIG. 23), a resonance voltage wave does not zero-cross in the rising-down duration (duration A in FIG. 24), which is a shortage of the first through eighth embodiments. To overcome such a shortage, the structure shown in FIG. 23 can be considered.

First through seventh embodiments are for power supplies having loads necessitating an intermediate amount of power, but the following embodiments are for those having loads necessitating a relatively large amount of electric power.

Figure 23:
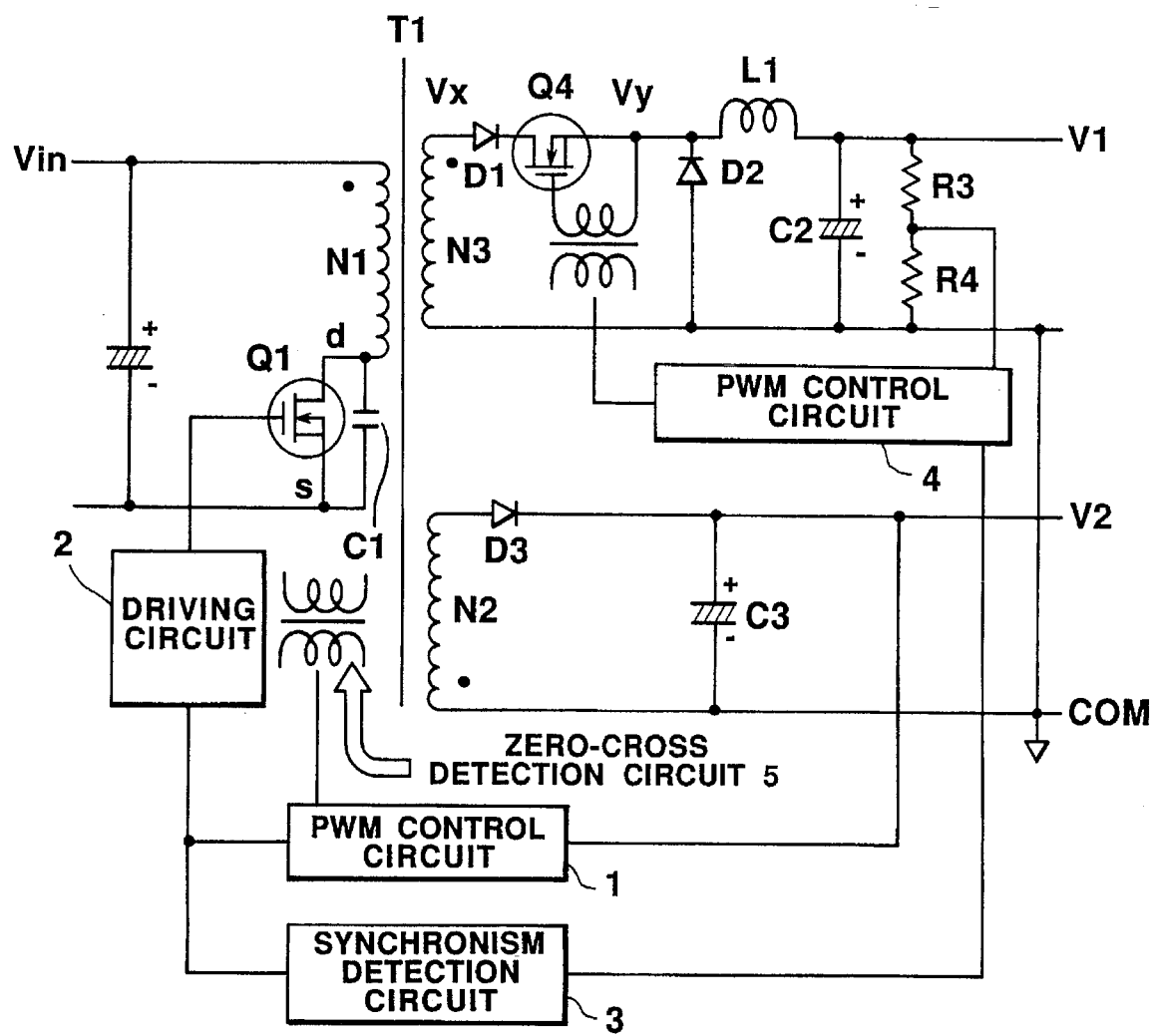
FIG. 23 is a diagram illustrating the circuitry of an embodiment.

In this voltage-resonance-type switching regulator of FIG. 23, switching device Q4 is provided at the secondary side in order to deal with a large-power pulsed load, such as a motor or the like.

This switching device Q4 is pulse-width controlled in the same frequency and in synchronized with the primary switching device Q1. Further, turning on of the switching device Q4 is inhibited during the period while the switching device Q1 generates a flyback wave.

The configuration of this voltage-resonance-type switching regulator will now be described with reference to FIG. 23. In FIG. 23, there is shown converter transformer T1. Voltage Vin is applied to one end of winding N1 of the primary side of converter transformer T1. This voltage "Vin" serves as a power-supply voltage for converter transformer T1 as well as an input voltage to converter transformer T1 when switching device Q1 is turned on. However, the expression "input voltage" will be confused with the input voltage to converter transformer T1 when switching device Q1 is turned off, and this voltage Vin also serves as the power-supply voltage for the switching regulator. Hence, this voltage "Vin" will be hereinafter termed a "power-supply voltage". Another end of primary winding N1 is connected to the drain of FET Q1, serving as a switching device. The source of this switching device FET Q1 is grounded. By switching device FET Q1, voltages proportional to the turns ratios are generated at secondary windings N2 and N3. One end of secondary winding N3 is connected to the anode of rectifier diode D1, and the cathode of rectifier diode D1 is connected to the cathode of flywheel diode D2 and one end of choke coil L1 via switching device Q4 controlled by PWM control circuit 4. Another end of secondary winding N3 is connected to a COM potential. Another end of choke coil L1 is connected to one end of output capacitor C2. Another ends of flywheel diode D2 and output capacitor C2 are connected to the COM potential.

Figure 24:
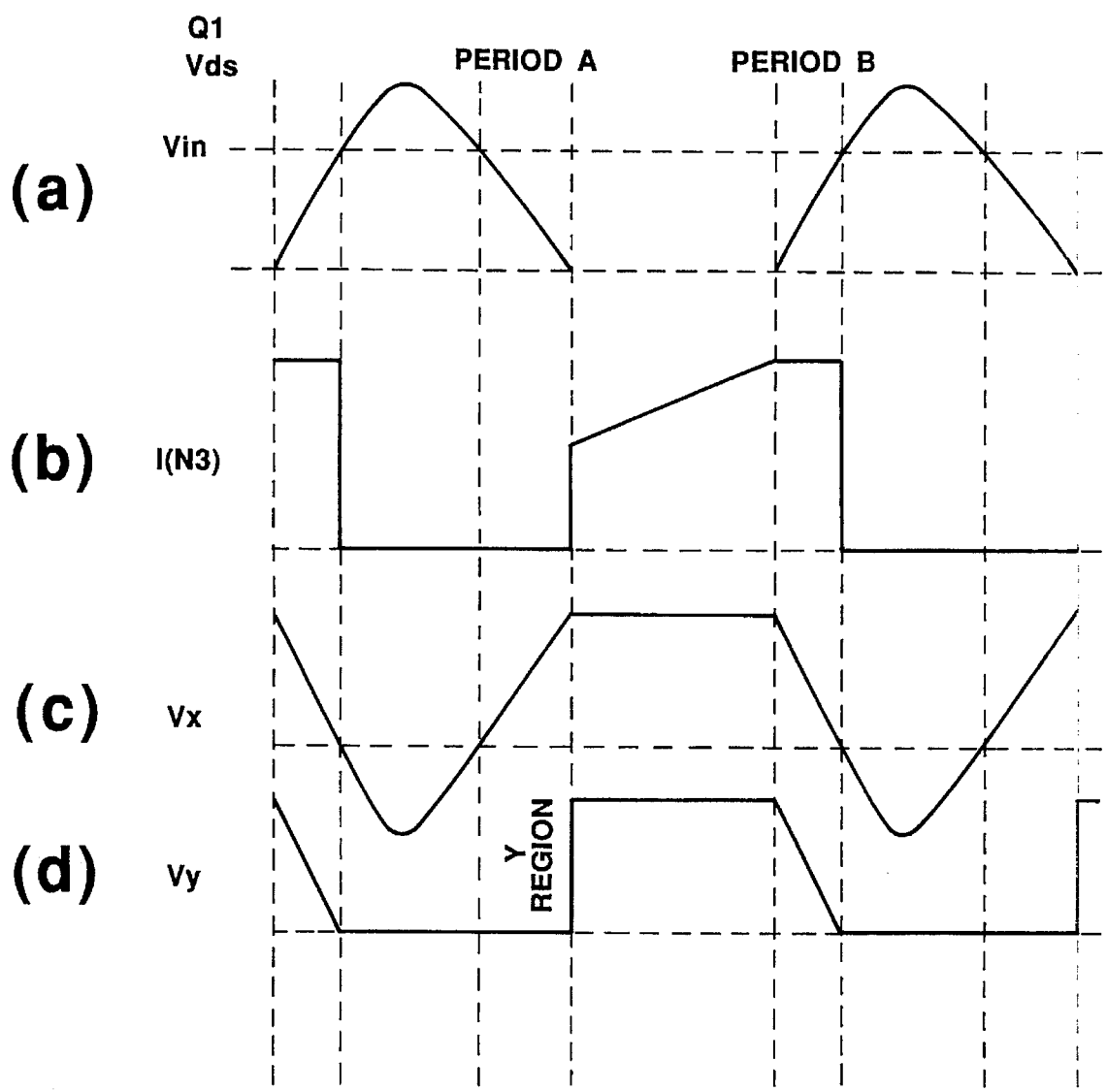
FIG. 24 illustrates waveforms at respective portions of FIG. 23.

Winding N2 is the main winding at the secondary side. In order to make the voltage after rectifying and smoothing the output of winding N2 constant, the duty ratio of switching of switching device Q1 is changed using PWM control circuit 1. According to the above-described configuration, a large-capacity voltage-resonance-type switching regulator of this type is realized. FIG. 24 illustrates waveforms at respective points of this switching regulator. The details of FIG. 24 will be described later.

The operation of the circuitry will be described with reference to FIGS. 23 and 24. For the convenience of description, the operation when switching device Q4 is not provided will be first described.

When switching device Q4 is absent, resonance voltage Vdc (the drain-source voltage of switching device Q1) does not become zero-crossed as the load at the side of secondary winding N3 is increased, and therefore electric power cannot be transmitted. This is because diode D1 at the forward side of the on-on-side output is turned on while resonance voltage Vds is equal to or less than power-supply voltage Vin. The following two periods are present.

(1) A period (period A shown in FIG. 24 in which switching device Q1 is turned off, resonance voltage Vds<power-supply voltage Vin, and the resonance current flows from capacitor C1 to power supply Vin.

During this period, resonance current I(RES) flows from capacitor C1 to power supply Vin. On the other hand, load current Ip(on/on) in winding N3 at the on-on side tends to flow from power supply Vin to capacitor C1 with a value Io×(Ns/Np) as seen from the primary side. Hence, the resonance current (in the direction of flowing from capacitor C1 to power supply Vin) apparently decreases, and the voltage decreases less steeply, causing difficulty in zero crossing of the voltage.

(2) A period (period B shown in FIG. 24 in which switching device Q1 is turned off, resonance voltage Vdc<power-supply voltage Vin, and the resonance current flows from power supply Vin to capacitor C1.

During this period, both resonance current I(RES) and load current Ip(on/on) in winding N3 at the on-on side tend to flow to capacitor C1 and interfere with each other, and the rising slope of Vds becomes steeper.

Due to the above-described periods (1) and (2), resonance voltage Vds leaves a sinusoidal wave as the load current is supplied from winding N3 at the on-on side, and finally zero crossing will not occur.

In order to overcome this problem, the following approaches (a) and (b) can be considered.

(a) Current Ip(on/on) in the on-on-side winding is relatively reduced by increasing resonance current I(RES). More specifically, resonance capacitor Cl is increased, or the inductance of converter transformer T1 is reduced. In this case, however, the resonance frequency decreases, and the exciting current for converter transformer T1 increases.

Thus, burden for switching device Q1 and the like increases, and converter transformer T1 tends to reach magnetic saturation, causing an increase in the size of converter transformer T1. Hence, this is not an optimum approach.

(b) Current Ip(on/on) in the on-on-side winding is interrupted during at least one of period A and period B.

The circuitry of FIG. 23 adopts the above-described approach (b). That is, current Ip(on/on) in the on-on-side winding is interrupted during period A using switching device Q4.

Next, a description will be provided of the operation when switching device Q4 is provided with reference to FIG. 24. In FIG. 24, Vx represents the voltage in on-on winding N3, and a voltage substantially having the shape of an isosceles trapezoid is produced at the positive side. If the "on" period of switching device Q4 is appropriately controlled by PWM control circuit 4, output voltage Vy of switching device Q4 has a waveform in which the voltage is absent in Y region, as shown in FIG. 24, and current I(N3) in on-on winding N3, that is, the current flowing through rectifier diode D1, becomes 0 during period A. Hence, the above-described interference between Ip(on/on) in the on-on winding and resonance current I(RES) during period A will not occur. Thus, the waveform of Vds approaches a sinusoidal wave (strictly speaking, it is also necessary to interrupt the current during period B), and a zero-crossing condition can be secured even if a load current several times greater than the current in the conventional approach is supplied. That is, a large-capacity switching regulator can be realized.

In the above-described voltage-resonance-type switching regulator, a triangular wave is formed in PWM control circuit 4 based a synchronizing signal from synchronism detection circuit 3, a PWM signal is formed by comparing the triangular wave with the output of the error amplifier by the comparator.

Accordingly, the maximum duty ratio of the PWM signal is constant irrespective of power-supply voltage Vin. Thus, the maximum value of output voltage V1 at the side of secondary winding N3 increases and decreases as power-supply voltage Vin increases and decreases, respectively. In order to secure output voltage V1, the maximum duty ratio of the PWM signal is determined in accordance with the minimum value of power-supply voltage Vin. Hence, when power-supply voltage Vin has the maximum value, the maximum value of output voltage V1 becomes too large. As a result, the power supply, the load, the switching device and the like of the apparatus may in some cases be damaged because of the too large power. This is a problem in a switching regulator, since a switching regulator is generally designed so as to deal with a power supply having a wide voltage range.

A description will now be provided of an embodiment of the present invention in which the above-described problem is solved.

Eighth Embodiment

Figure 19:
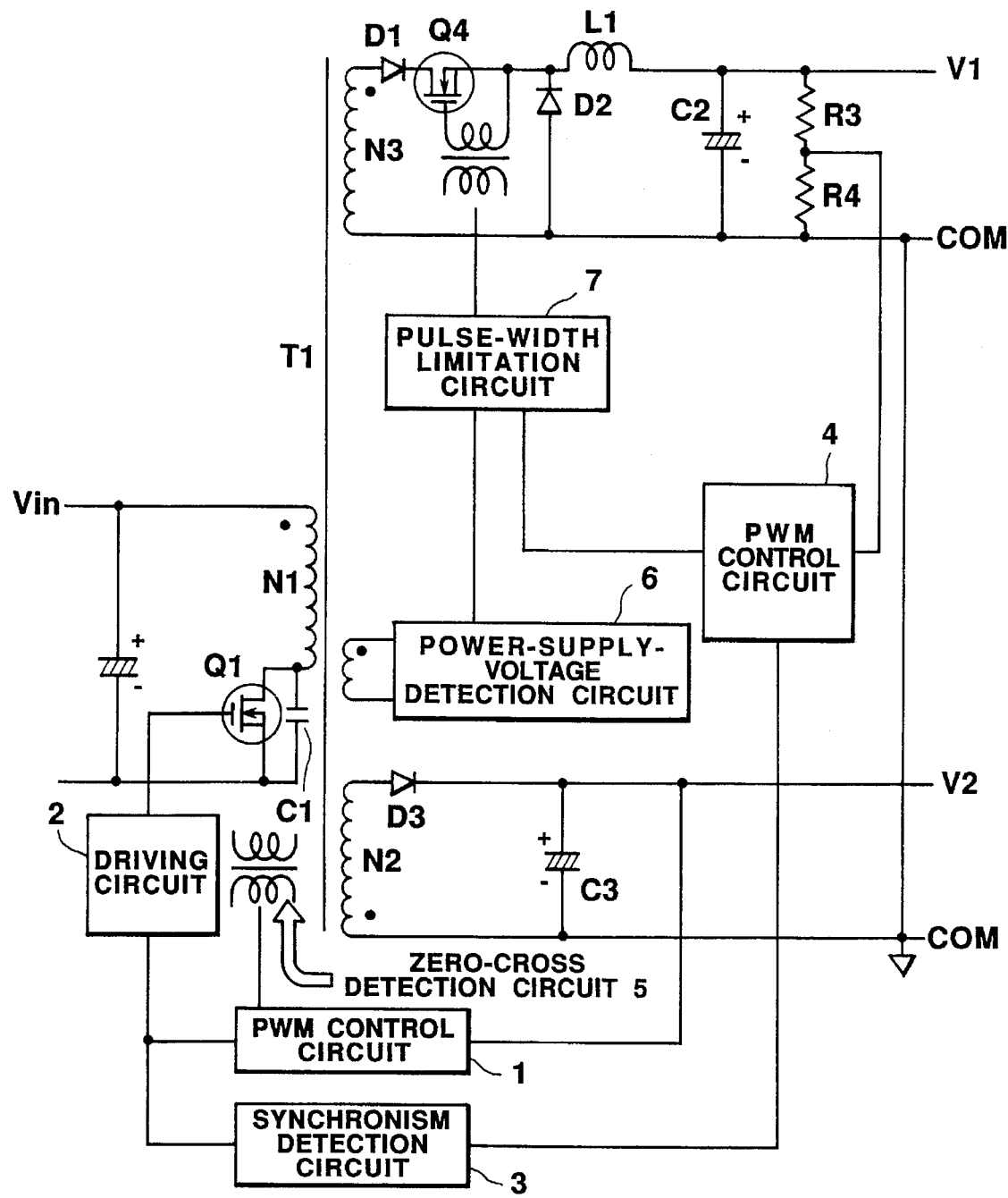
FIG. 19 is a diagram illustrating the circuitry of an apparatus according to an eighth embodiment of the present invention.

FIG. 19 is a digram illustrating the circuitry of a "voltage-resonance-type switching regulator" according to an eighth embodiment of the present invention. In FIG. 19, there is shown a converter transformer T1. Power-supply voltage Vin is supplied to one end of primary winding N1 of converter transformer T1. Another end of primary winding N1 is connected to the drain of FET Q1 which serves as a switching device. The source of switching device FET Q1 is grounded. By switching device FET Q1, a desired voltage is generated at secondary windings N2 and N3 in proportion to respective turns ratio. One end of secondary winding N3 is connected to the anode of rectifier diode D1, and another end of winding N3 is connected to a COM potential. The cathode of rectifier diode D1 is connected to the cathode of flywheel diode D2 and one end of choke coil L1 via switching device Q4 driven by PWM control circuit 4 and pulse-width limitation circuit 7. Another end of choke coil L1 is connected to one end of output capacitor C2. Another ends of flywheel diode D2 and output capacitor C2 are connected to the COM potential. Pulse-width limitation circuit 7 limits the maximum duty ratio of switching device Q4 in accordance with power-supply voltage Vin detected by power-supply-voltage detection circuit 6. PWM control circuit 4 performs a PWM control in synchronization with driving circuit 2 through synchronism detection circuit 3.

Secondary winding N2 is the main winding at the secondary side. In order to make the voltage after rectifying and smoothing the output of winding N2 constant, the duty ratio of switching of switching device Q1 is changed using PWM control circuit 1.

Figure 20:
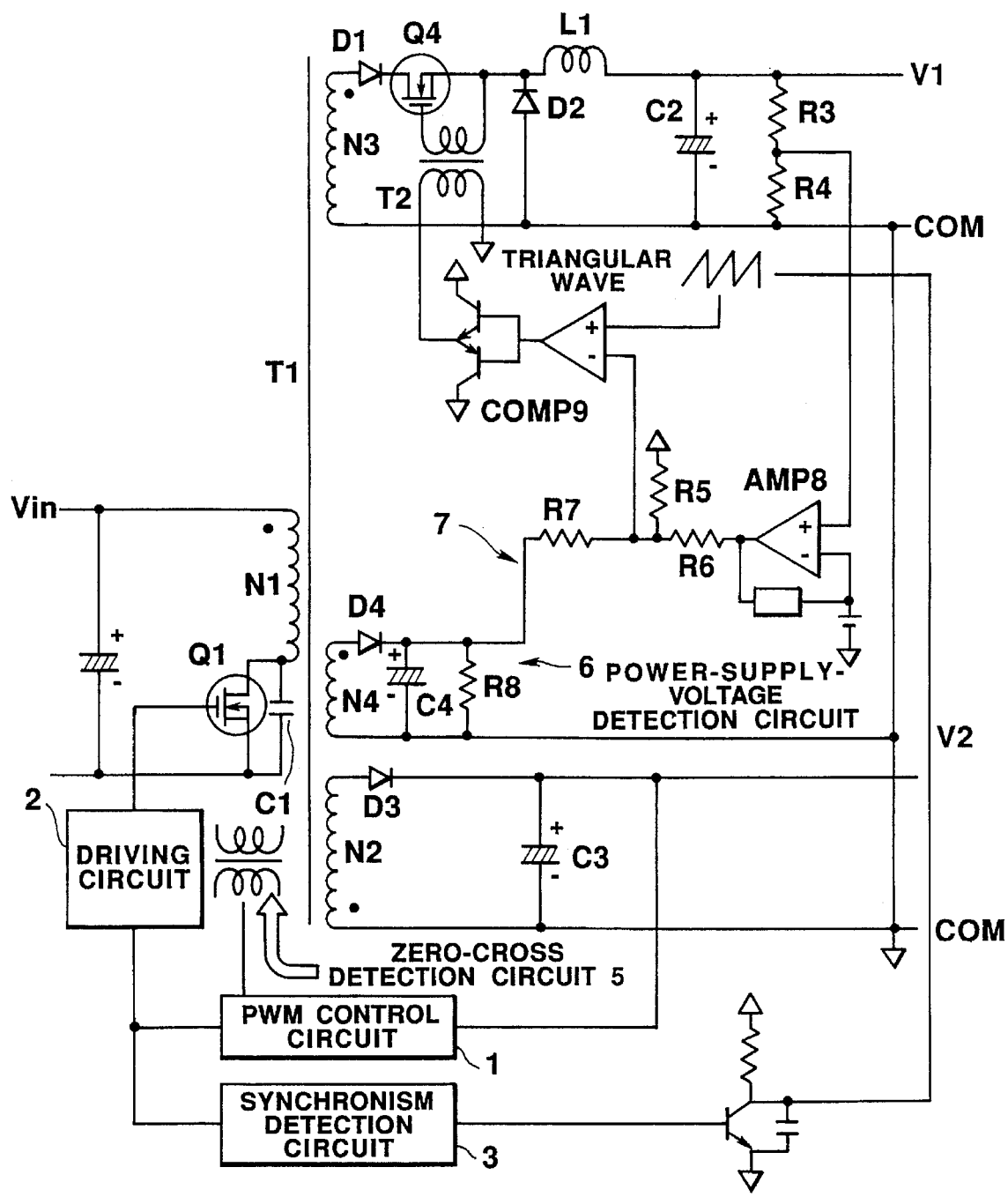
FIG. 20 is a diagram illustrating the details of the circuitry shown in FIG. 19.

As described above, the circuitry of the present embodiment differs from the circuitry of FIG. 23 in that power-supply-voltage detection circuit 6 and pulse-width limitation circuit 7 are provided. A portion differed from the circuitry of FIG. 23 will be described with reference to the detailed circuit diagram of FIG. 20. As shown in FIG. 20, a synchronizing signal is obtained from synchronism detection circuit 3, a triangular wave is formed from the obtained signal, the formed triangular wave is compared with the output of error amplifier AMP8 by comparator COMP9, and the PWM control of switching device Q4 is performed. In general, an approach in which the maximum duty cycle of comparator COMP9 is determined by resistors R5 and R6 is adopted. In this approach, however, since the maximum duty cycle becomes constant, the maximum value of output voltage V1 increases and decreases as power-supply voltage Vin increases and decreases, respectively. If the values of resistors R5 and R6 are determined in accordance with the minimum value of power-supply voltage Vin in order to secure output voltage V1, the maximum value of output voltage V1 becomes too large when power-supply voltage Vin has the maximum value. It is clear that this is not preferable from the viewpoint of protecting the power supply, the load and the switching device of the switching regulator.

In the present embodiment, power-supply voltage Vin is detected by power-supply-voltage detection circuit 6, and the maximum duty cycle of switching device Q4 is arranged to have dependency on power-supply voltage Vin in accordance with the detected voltage Vin, so that the maximum value of output voltage V1 is made to be constant irrespective of changes in power-supply voltage Vin. That is, in the circuitry of FIG. 20, power-supply voltage Vin is detected using devices N4, D4, C4 and R8, and the detected voltage is supplied to the output side of error amplifier AMP8 via resistor R7, so that the voltage at the minus (−) input terminal of comparator COMP9 increases and the duty cycle of switching device Q4 decreases as power-supply voltage Vin increases. Thus, the maximum duty ratio has dependency on power-supply voltage Vin, so that the maximum value of output voltage V1 is constant irrespective of changes in power-supply voltage Vin.

As described above, in the present embodiment, since the maximum value of output voltage V1 is constant irrespective of changes in power-supply voltage Vin for converter transformer T1, an excessive burden is not applied on the power supply, the load, the switching device and the like of the switching regulator.

Furthermore, since the dependency of the maximum output power on the power-supply voltage disappears, the size and the cost of a switching regulator can be reduced from the viewpoint of thermal design.

Ninth Embodiment

Figure 21:
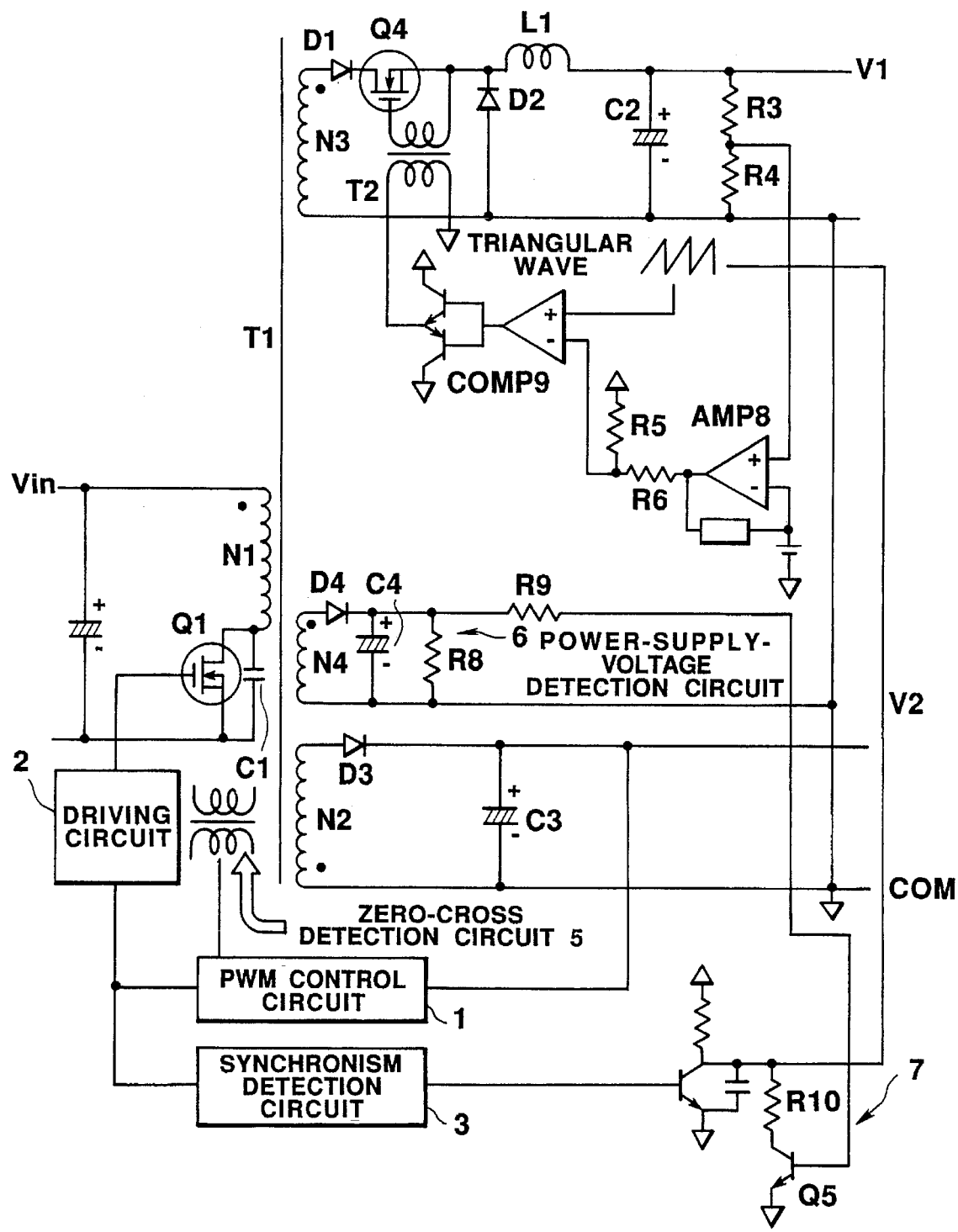
FIG. 21 is a diagram illustrating the details of the circuitry of an apparatus according to a ninth embodiment of the present invention.

FIG. 21 is a diagram illustrating the details of the circuitry of an apparatus according to a ninth embodiment of the present invention. As shown in FIG. 21, in the present embodiment, the amplitude of a triangular voltage is changed by transistor Q5 controlled by the output of power-supply-voltage detection circuit 6 to provide the maximum duty cycle of switching device Q4 with dependency on the power-supply voltage. Thus, the maximum value of output voltage V1 is arranged to be constant irrespective of changes in power-supply voltage Vin. As described above, also in the present embodiment, the same effects as in the first embodiment can be obtained.

Tenth Embodiment

Figure 22:
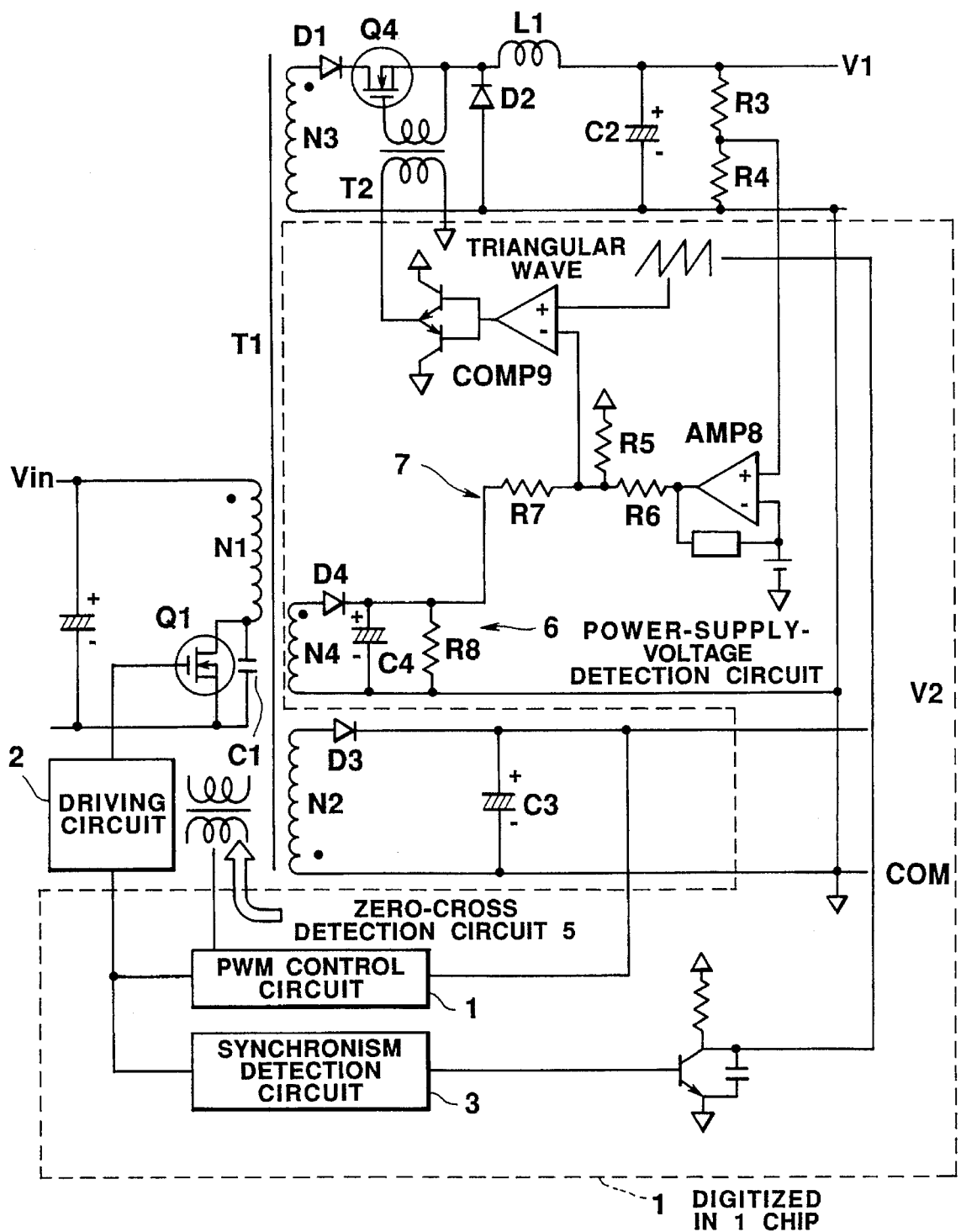
FIG. 22 is a diagram illustrating the details of the circuitry of an apparatus according to a tenth embodiment of the present invention.

FIG. 22 is a diagram illustrating the circuitry of an apparatus according to a tenth embodiment of the present invention. In FIG. 22, by providing components enclosed with broken lines, such as PWM control circuits i and 4, synchronism detection circuit 3, pulse-width limitation circuit 7, power-supply-voltage detection circuit 6 and the like, on a one-chip IC, and providing a part of the circuitry as software, the apparatus can be provided in a small size and can be used for general purposes.

Although in each of the above-described embodiments, a description has been provided of a voltage-resonance-type switching regulator, the present invention is not limited to switching regulators of this type, but may also be applied to switching regulators of any other types. Although in each of the above-described embodiments, voltage levels are compared by a comparator, the present invention is not limited to this approach, but may also be applied to an approach in which current levels are compared.

As described above, according to the present invention, it is possible to provide an efficient multi-output control power supply apparatus which has a simple configuration. In addition, an excessive burden is not applied on the power supply, the load, and the switching device of the apparatus, and reliability of the apparatus is improved. In addition, since the upper limit of the pulse width×voltage can be limited irrespective of the power-supply voltage, the apparatus can operate even if the response of control for a pulsed load is slow. Furthermore, since the maximum output power does not depend on the power-supply voltage, the size and the cost of the apparatus can be reduced from the view-point of thermal design.

Next, still another embodiments of the present invention will be described.

Eleventh Embodiment

In each of the first through fourth embodiments, since the switching device is provided at the high-voltage side, the loss in the base-current-limiting resistor has a large value. In each of the fifth through seventh embodiments, since the switching device is provided at the low-voltage side, the loss in the base-current-limiting resistor has a small value, but a power supply for driving the base is required. The following eleventh and twelfth embodiments of the present invention intend to solve the above-described problems.

Figure 10:
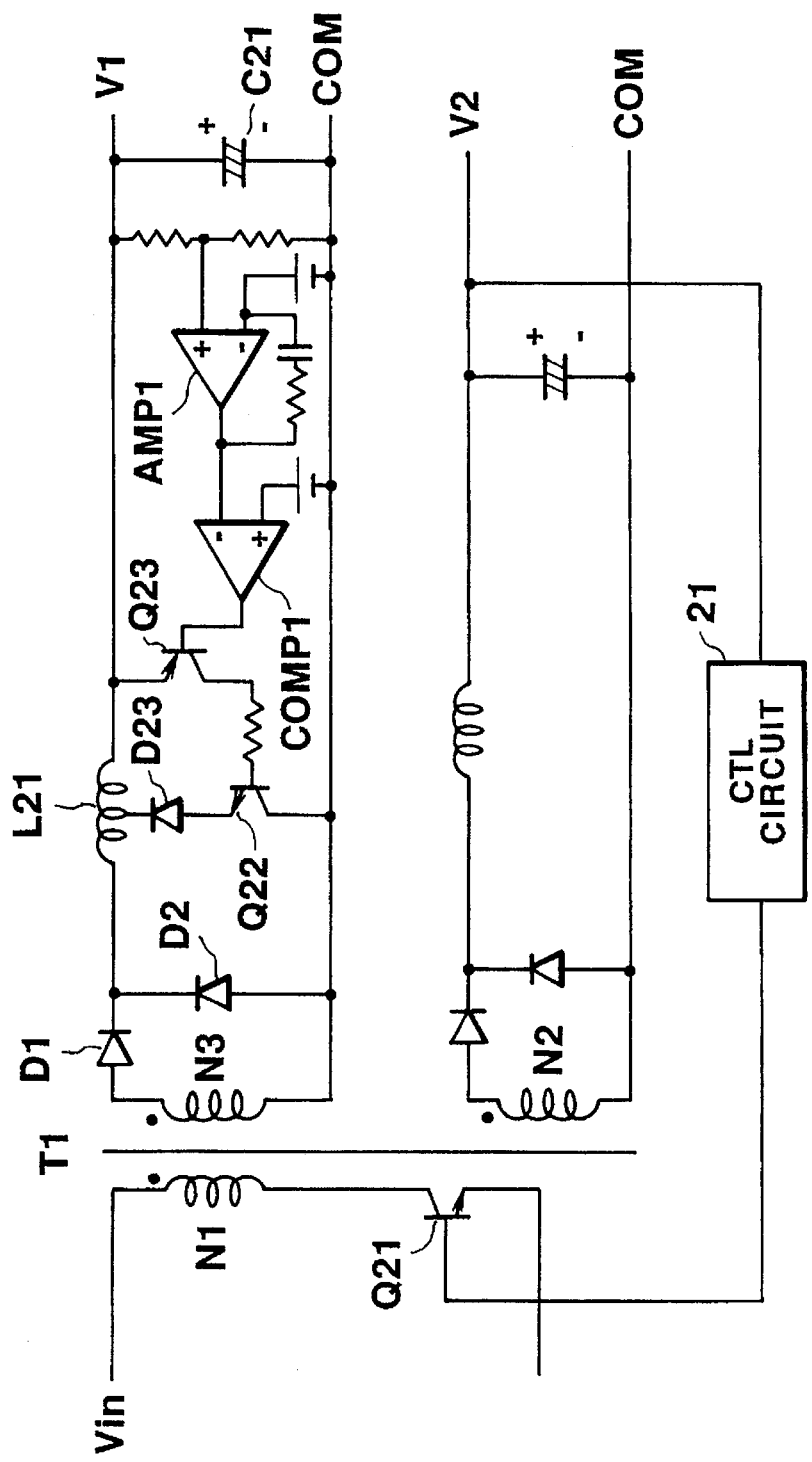
FIG. 10 is a diagram illustrating the circuitry of an apparatus according to an eighth embodiment of the present invention.

FIG. 10 is a diagram illustrating the circuitry of a "multi-output control power supply apparatus" according to an eleventh embodiment of the present invention. In FIG. 10, there is shown a converter transformer T1. Power-supply voltage Vin is supplied to one end of primary winding N1 of converter transformer T1. Another end of the winding N1 is connected to the collector of transistor Q12 which serves as a switching device. The emitter of transistor Q12 is grounded. By switching transistor Q12, a desired voltage is generated at secondary winding N3 in proportion to the turns ratio. One end of winding N3 is connected to the anode of rectifier diode D1, and another end of winding N3 is connected to a COM (common) potential point. The cathode of rectifier diode D1 is connected to the cathode of flywheel diode D2 and one end of choke coil L21 having a tap. Another end of choke coil L21 is connected to output capacitor C21. The anode of flywheel diode D2 and another end of capacitor C21 are connected to the COM potential point.

The cathode of diode D23 is connected to the tap of choke coil L21, and the emitter of switching transistor Q22 is connected to the anode of diode D23 in series. The collector of switching transistor Q22 is connected to the COM potential point. The driving circuit for transistor Q22 is configured by transistor Q23, comparator COMP1, and error amplifier AMP1.

Winding N2 is the main winding at the secondary side. In order to make the voltage after rectifying and smoothing the output of winding N2 constant, the duty ratio of switching of transistor Q21 is changed using CTL (control) circuit 21.

The operation of the circuitry will now be described. If transistor Q2 is always turned off, the circuitry of the present embodiment performs average-value rectification as an ordinary on/on converter, and has the following value of output voltage V1.

$$V1=Vin\times\{Ton1/(Ton1+Toff1)\}\times x \quad (1).$$

Figure 11:
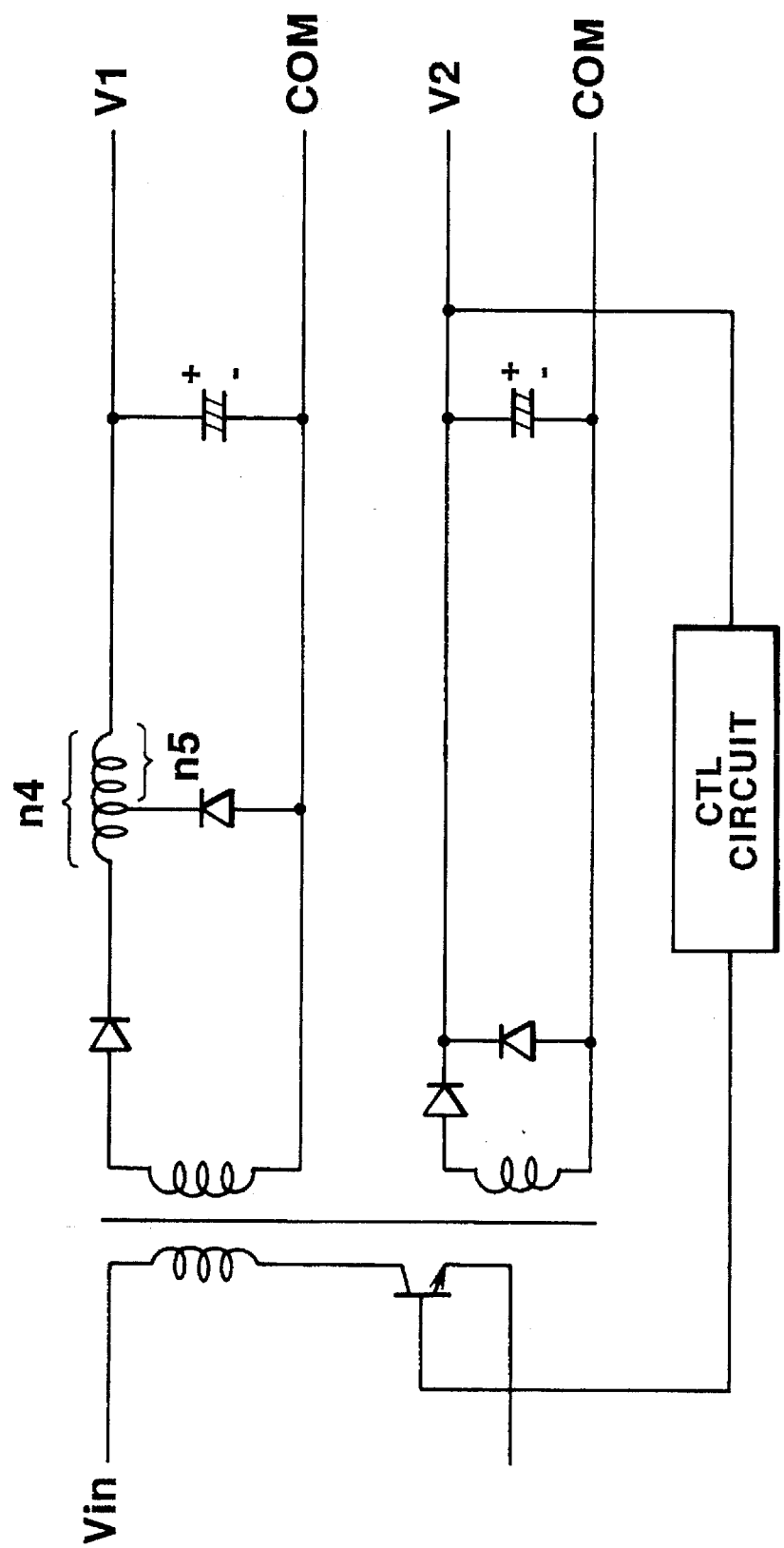
FIG. 11 is a schematic diagram illustrating a state in which transistor Q22 shown in FIG. 10 is turned on in the eighth embodiment.

If transistor Q22 is always turned off, the circuitry becomes equivalent to the circuitry shown in FIG. 11, and $$V1=Vin\times\{Ton1/Ton1+a\times Toff1)\}\times x \quad (2),$$

where a=n4/n5, x=n3/n1, Ton1 represents the "on" period of switch 1 (Q21), Toff1 represents the "off" period of switch 1, and nx represents the number of turns of winding Nx. The case of a=1 corresponds to an ordinary on/on converter (refer to the following description for the proof of expression (2)).

Figure 12:
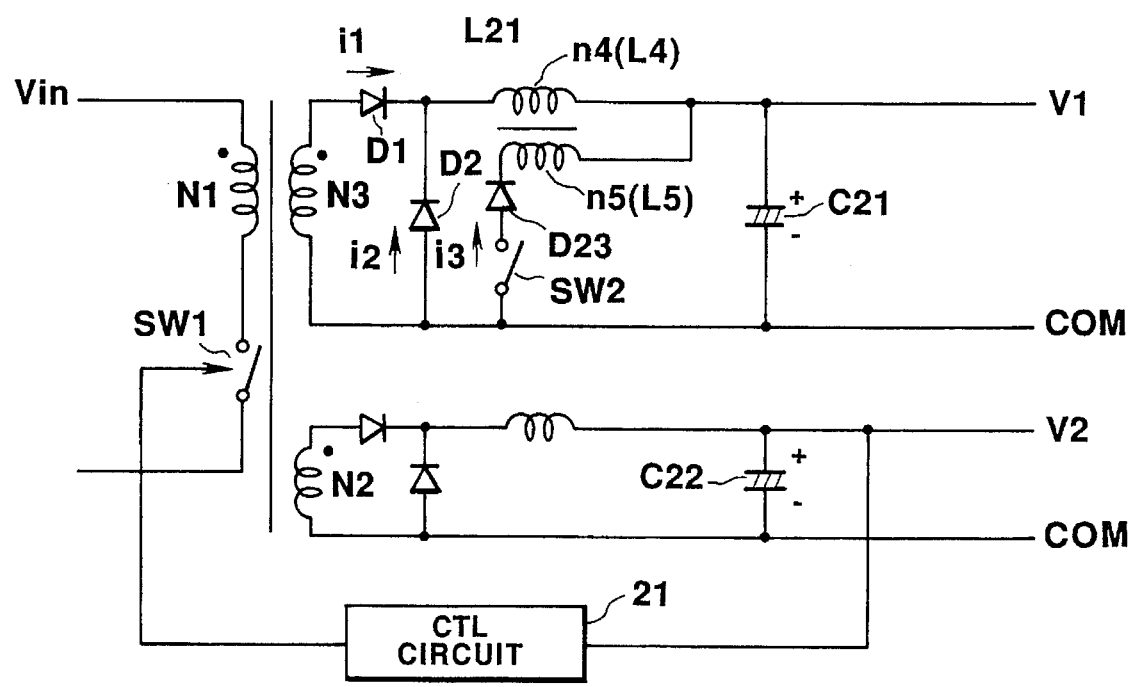
FIG. 12 is a diagram illustrating a principle in which the eighth embodiment is generalized.
Figure 13:
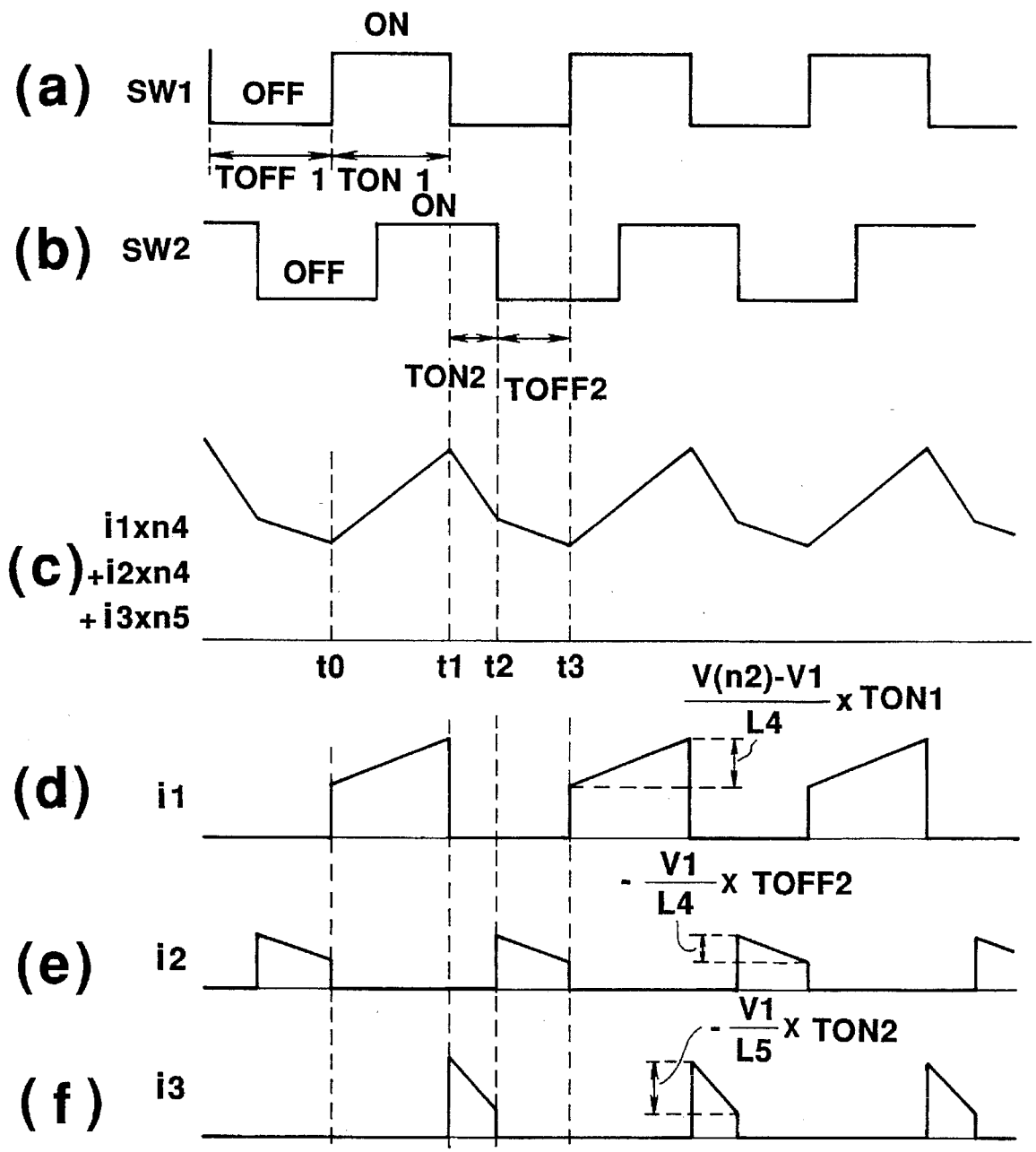
FIG. 13 illustrates timing charts of the circuitry shown in FIG. 12.

Next, the operation of the present embodiment will be described with reference to the circuitry of FIG. 12 in which the circuitry of a principal portion of the apparatus of the present embodiment is generalized, and the timing charts thereof shown in FIG. 13. First, the case, in which switch SW2 is switched on and off while switch SW1 is switched off, will be considered.

In the following description, Ton2 represents the effective "on" period of switch SW2 (the time period between t1 and t2 shown in FIG. 13), Toff2 represents the effective "off" period of switch SW2 (the time period between t2 and t3 shown in FIG. 13), Ton2+Toff2=Toff1, i1 represents the current flowing through flywheel diode D2 (see i1 shown in FIG. 13), i2 represents the current flowing through flywheel diode D2 (see i2 shown in FIG. 13), i3 represents the current flowing through sub-flywheel diode D2 (see i3 shown in FIG. 13), L4 represents the inductance of winding n4, and L5 represents the inductance of winding n5. The forward voltage Vf of the diode will be neglected for the purpose of simplification.

A description will be provided while dividing one period into three periods (1), (2) and (3).

It is necessary that L4>L5, and a step-down type power supply apparatus will be provided.

(1) t1-t1 (SW1 is turned on)

While switch SW1 is turned on, i3=0 irrespective of the switching-on and switching-off of switch SW2. That is, n5 is equivalent to be absent, and the variation Δi1 of the value i1 is $$\Delta i1=[\{V(n3)-V2\}/L4]\times Ton1,$$

where V(n3)=Vin×(n3/n1), and it is clear that

Δi2=0, and

Δi3=0.

(2) t1-t2 (SW1 is turned off, and SW2 is turned on)

While switch SW1 is turned off, and switch SW2 is turned on, the flywheel current through the choke coil flows to winding n5 having a smaller inductance value LS, but does not flow to winding n4 having a greater inductance value L4. Hence, Δi1=0, Δi2=0, and Δi3=−[V1/LS]×Ton2.

(3) t2-t3 (SW1 is turned off, and SW2 is turned off)

While switch SW1 is turned off, and switch SW2 is turned off, the flywheel current through the choke coil changes from i3 to i2, and Δi1=0, Δi2=−[V1/L4]×Toff2

Δi3=0.

In the condition that the current in the output choke coil is continuous (has at least the critical current value), considering that (Δi1×n4+Δi2×n4+Δi3×n5) becomes 0 in one period, the following expression is obtained:

$$n4\times\{V(n3)-V1\}/L4\times Ton1-n5\times V1/L5\times Ton2-n4\times V1/L4\times Toff2=0,$$
and $$L4/L5=(n4/n5)^2 \quad (3).$$

The following expression is obtained by solving expression (3):

$$V1=Vin\times(n3/n1)\times[Ton1/\{Ton1+(n4/n5)\times Ton2+Toff2\}],\text{ and}$$

$$Ton2+Toff2=Toff1 \quad (4).$$

If Ton2=0 in expression (4), expression (1) is obtained, and if Toff2=0 in expression (4), expression (2) is obtained. That is, by controlling the timing of the switching-on and the switching-off of switch SW2, if n4>n5, output voltage V1 can be controlled to be constant within the range of $$V1(max)=Vin\times x\times\{Ton1/Ton1+Toff1)\},\text{ and}$$

$$V2(min)=Vin\times x\times\{Ton1/(Ton1+(n4/n5)Toff1)\},$$

where
x=n3/n1.

Figure 14:
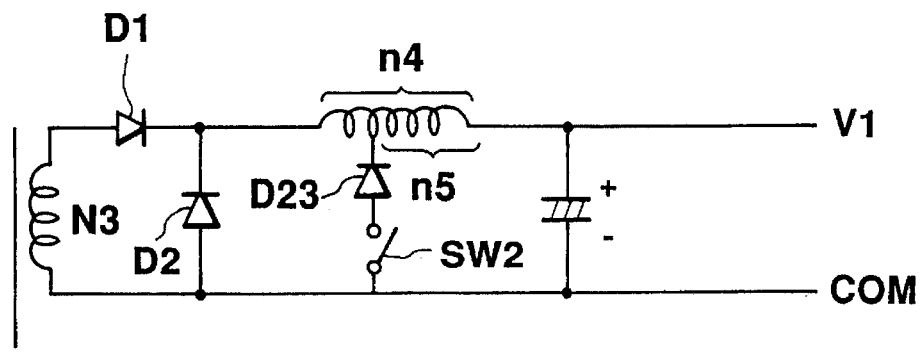
FIG. 14 is a diagram illustrating the principle of an eleventh embodiment of the present invention.

As can be understood from FIG. 14, if switch SW2 is switched off to a degree close to the impedance of (n4/n5), the current is switched to flywheel diode D2 (i3 is switched to i2). Hence, the switching loss has a small value.

FIG. 14 is a diagram illustrating the principle of the eighth embodiment. As described above, the eighth embodiment provides a step-down type power supply apparatus using a choke coil having a tap.

As described above, according to the present embodiment, it is possible to provide a multi-output control power supply apparatus which has a relatively simple configuration without requiring synchronism, has a small amount of loss, and does not require a power supply for driving the base of a transistor.

Twelfth Embodiment

Figure 15:
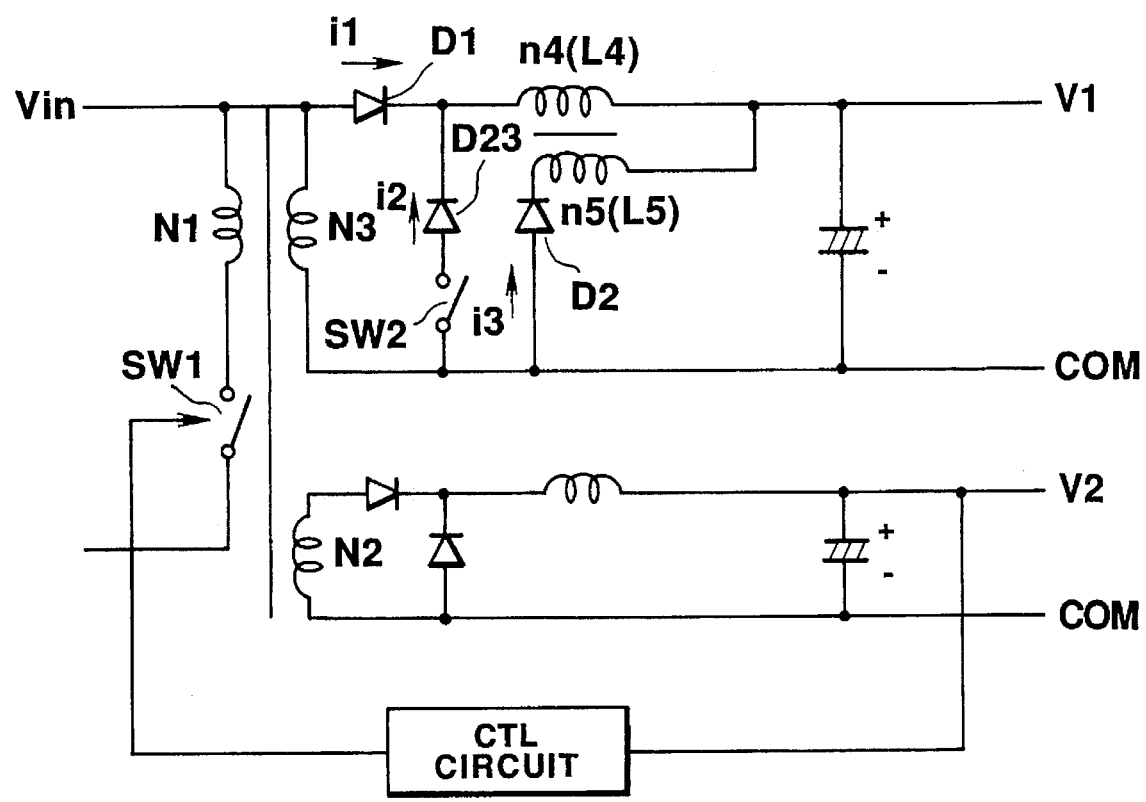
FIG. 15 is a diagram illustrating the principle of a twelfth embodiment of the present invention.

The same operation as in the eleventh embodiment can also be realized by using a step-up type power supply apparatus, as shown in FIG. 15. A description will be provided of such a device as a twelfth embodiment of the present invention. In the present embodiment, it is necessary that L4<L5.

(1) t0-t1 (SW1 is turned on)

As in the case of a step-down type apparatus, the variation $\Delta i1$ of the value i1 is expressed by:

$$\Delta i1 = [\{V(n3) - V1\}/L4] \times Ton1,$$

where $V(n3) = Vin \times (n3/n1)$, and it is clear that $\Delta i2 = 0$, and $\Delta i3 = 0$.

(2) t1-t2 (SW1 is turned off, and SW2 is turned on)

While switch SW1 is turned off, and switch SW2 is turned on, the flywheel current through the choke coil flows to n4 having a smaller inductance value L4, and does not flow to n5 having a greater inductancd value L5. Hence, $\Delta i1 = 0$, $\Delta i2 = -[V1/L4] \times Ton2$, and $\Delta i3 = 0$.

(3) t2-t3 (SW1 is turned off, and SW2 is turned off)

While switch SW1 is turned off, and switch SW2 is turned off, the flywheel current through the choke coil is switched from i2 to i3, and $\Delta i1 = 0$, $\Delta i2 = 0$, and $\Delta i3 = -[V1/L5] \times Toff2$.

In the condition that the current of the output choke coil is continuous (has at least the critical current value), considering that the value $(\Delta i1 \times n4 + \Delta i2 \times n4 + \Delta i3 \times n5)$ becomes 0 in one period, the following expression is obtained:

$$n4 \times \{V(n3) - V1\}/L4 \times Ton1 - n4 \times V1/L4 \times Ton2 - n5 \times V1/L5 \times Toff2 = 0, \text{ and}$$

$$L4/L5 = (n4/n5)^2 \quad (5).$$

The following expression is obtained by solving expression (5):

$$V1 = Vin \times (n3/n1) \times [Ton1/\{Ton1 + Ton2 + (n4/n5) \times Toff2\}], \text{ and} \quad (6).$$

$$Ton2 + Toff2 = Toff1$$

That is, by controlling the timing of the switching-on and the switching-off of switch SW2, if n4>n5, output voltage V1 can be controlled to be constant within the range of $$V1(min) = Vin \times x \times \{Ton1/Ton1 + Toff1\}, \text{ and}$$

$$V2(max) = Vin \times x \times \{Ton1/(Ton1 + (n4/n5)Toff1)\},$$

where $x = n3/n1$.

Figure 16:
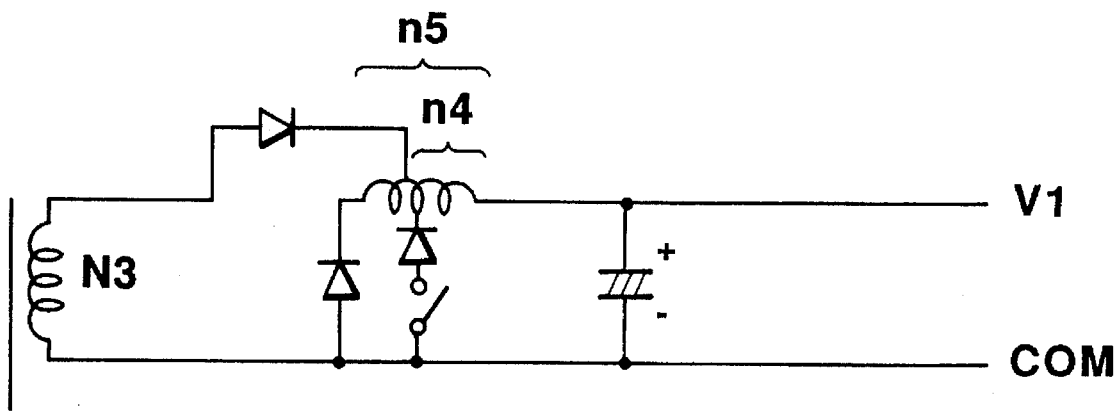
FIG. 16 is a diagram illustrating the principle of a modification of the twelfth embodiment.

The present embodiment can be modified as shown in FIG. 16.

Figure 17:
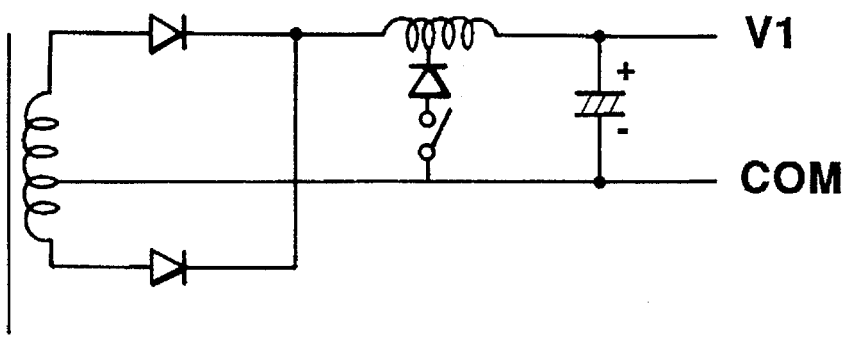
FIG. 17 is a diagram illustrating a modification of the eleventh and the twelfth embodiments.

The same effect can be obtained even if it is arranged so that the switching frequency of switch SW2< the switching frequency of switch SW1 in the eleventh and twelfth embodiments. The same effect may also be obtained using a half-bridge circuit, as shown in FIG. 17. The important point in the eleventh and twelfth embodiments is to switch the inductance of the choke coil, and the effect does not depend on the rectifying means at the secondary side. Accordingly, the same operation as in the forward converter is performed in a circuit other than the forward converter, for example, a half-bridge circuit.

While the present invention has been described with respect to what is present1 considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A voltage-resonant-type switching regulator, comprising:
    a) a transformer comprising:
        a primary winding;
        a first secondary winding;
        a second secondary winding;
        a first switching device for switching said primary winding;
        a resonant capacitor connected to said primary winding; and
        a feedback circuit for controlling a switching operation of said first switching device in accordance with the output of said first secondary winding,
    b) a second switching device for switching the output of said second secondary winding; and
    c) a synchronizing circuit for synchronizing said second switching device with the switching operation of said first switching device to reduce an interference between a current flowing through said second secondary winding and a resonant current flowing from said resonant capacitor through said primary winding.

2. A voltage,resonant-type switching regulator according to claim 1, wherein said synchronizing circuit switches said second switching device during "off" periods of said first switching device.

3. A voltage-resonant-type switching regulator according to claim 1, further comprising:
    power-supply-voltage detection means for detecting the voltage of a power supply for said transformer; and
    control means for performing an on-off control of said second switching means in accordance with the output of said power-supply-voltage detection means.

4. A voltage-resonant-type switching regulator according to claim 1, wherein said synchronizing circuit prevents the current from flowing through said second secondary winding while a resonant voltage is smaller than an input voltage to said primary and while the resonant current flows from said resonant capacitor through said primary winding.

5. A voltage-resonant-type switching regulator according to claim 1, wherein said switching circuit keeps said second switching device off between a time when an output of said second secondary winding turns positive and a time when the resonant currents stops.

6. A voltage-resonant-type switching regulator according to claim 1, wherein said first secondary winding is an on-off winding and said second secondary winding is an on-on winding.

7. A switching regulator for switching the primary of a converter transformer and supplying an output from an on-on winding of the secondary side of the converter transformer, said switching regulator comprising:
    switching means connected in series with the on-on winding;

power-supply-voltage detection means for detecting the voltage of a power supply for the converter transformer; and control means for performing an on-off control of said switching means in accordance with the output of said power-supply-voltage detection means, wherein said control means comprises a comparator for comparing the output of an error amplifier with a triangular wave synchronized with switching at the primary side of the converter transformer, and wherein said control means changes the output level of said error amplifier in accordance with the output of said power-supply-voltage detection means.

8. A multi-output control power supply apparatus, comprising:

a converter transformer comprising a primary winding and first and second secondary windings;

first switching means for intermitting a connection between said primary winding and a power supply thereof;

rectifying and smoothing means for rectifying and smoothing the output of said first secondary winding and supplying the resultant output to a first output terminal;

PWM control means for performing a PWM control of said first switching means in accordance with a voltage at the first output terminal;

rectifying means for rectifying the output of said second secondary winding and supplying the resultant output to a second output terminal;

second switching means for intermitting the low-voltage side of the output of said second secondary winding;

synchronism detection means for obtaining a signal synchronized with a pulse generated by said PWM control means from the output of said PWM control means;

comparison means for comparing a voltage at the second output terminal with a reference value; and holding means for updating and holding the output of said comparison means in accordance with the output of said synchronism detection means, and for supplying the resultant output to said second switching means as a control signal.

9. A multi-output control power supply apparatus, comprising:

a converter transformer comprising a primary winding and first and second secondary windings;

first switching means for intermitting a connection between said primary winding and a power supply thereof;

rectifying and smoothing means for rectifying and smoothing the output of said first secondary winding and supplying the resultant output to a first output terminal;

PWM control means for performing PWM control of said first switching means in accordance with a voltage at the first output terminal;

rectifying means connected to one end of said second secondary winding;

a choke coil having one of a tap and two windings for supplying a second output terminal with the output of said rectifying means;

second switching means for intermitting a connection between the one of the tap and one end of the two windings and another end of said second secondary winding;

comparison means for comparing a voltage at the second output terminal with a reference value, and for supplying said second switching means with an output as a result of the comparison as a control signal; and a flywheel diode connected to another end of the two windings and another end of said second secondary winding.

10. A multi-output control power supply apparatus, comprising:

a converter transformer comprising a primary winding and first and second secondary windings;

first switching means for intermitting a connection between said primary winding and a power supply thereof;

rectifying and smoothing means for rectifying and smoothing the output of said first secondary winding and supplying the resultant output to a first output terminal;

PWM control means for performing PWM control of said first switching means in accordance with a voltage at said first output terminal;

rectifying means connected to one end of said second secondary winding;

a choke coil having two windings for supplying a second output terminal with the output of said rectifying means;

second switching means for intermitting a connection between a common connection point of said two-winding choke coil and said rectifying means and another end of said second secondary winding;

a flywheel diode connected between an end of the two windings opposite to the side connected to said rectifying means and another end of said second secondary winding; and comparison means for comparing a voltage at the second output terminal with a reference value, and for supplying said second switching means with an output as a result of the comparison as a control signal.

11. A multi-output power supply apparatus, comprising:

a) a transformer comprising:
   a primary winding;
   a first secondary winding;
   a second secondary winding;
   a first switching device for switching said primary winding; and
   a feedback circuit for controlling the switching operation of said first switching device in accordance with the output of said first secondary winding, b) a second switching device provided at the low-voltage side of the output of said second secondary winding for switching the output; and c) a driving circuit for switching said second switching device at a frequency lower than a switching frequency for said first switching device.

12. A multi-output power supply apparatus according to claim 11, wherein said driving circuit switches said second switching device during an "off" period of said first switching device.

13. A switching regulator for switching the primary of a converter transformer and supplying an output from an on-on winding of the secondary side of the converter transformer, said switching regulator comprising:

switching means connected in series with the on-on winding;

power-supply-voltage detection means for detecting the voltage of a power supply for the converter transformer; and control means for performing an on-off control of said switching means in accordance with the output of said power-supply-voltage detection means, wherein said control means comprises a comparator for comparing the output of an error amplifier with a triangular wave synchronized with switching at the primary side of the converter transformer, and wherein said control means changes the output level of the triangular wave in accordance with the output of said power-supply-voltage detection means.

14. A switching regulator for switching the primary of a converter transformer and supplying an output from an on-on winding of the secondary side of the converter transformer, said switching regulator comprising:

switching means connected in series with the on-on winding;

power-supply-voltage detection means for detecting the voltage of a power supply for the converter transformer; and control means for performing an on-off control of said switching means in accordance with the output of said power-supply-voltage detection means, wherein said control means comprises digital circuitry for controlling said switching regulator including a central processing unit, a read-only memory, a random access memory and analog circuitry including digital-to-analog converting means, said digital circuitry being formed as a one-chip integrated circuit.

15. A multi-output power supply apparatus, comprising:
a) A transformer comprising:
a primary winding;
an on-off secondary winding;
an on-on secondary winding;
a first switching device for switching said primary winding; and
a feedback circuit for controlling the switching operation of said first switching device in accordance with the output of said on-off secondary winding,
b) a second switching device for switching the output of said on-on secondary winding;
c) a power-supply-voltage detection circuit for detecting an input voltage to said primary winding; and
d) a driving circuit for limiting an "on" period of the switching operation of said second switching device in accordance with the output of said power-supply-voltage detection circuit.

16. A multi-output power supply apparatus according to claim 15, wherein said transformer is a voltage-resonant-type transformer having a resonant capacitor.

17. A multi-output control power supply apparatus, comprising:

a converter transformer comprising a primary winding and first and second secondary windings;

first switching means for intermitting a connection between said primary winding and a power supply thereof;

rectifying and smoothing means for rectifying and smoothing the output of said first secondary winding and supplying the resultant output to a first output terminal;

PWM (pulse-width modulation) control means for performing a PWM control of said first switching means in accordance with a voltage at the first output terminal;

rectifying means for rectifying the output of said second secondary winding;

second switching means for intermitting the output of said rectifying means and supplying the resultant output to a second output terminal;

synchronism detection means for obtaining a signal synchronized with a pulse generated by said PWM control means from the output of said PWM control means;

comparison means for comparing a voltage at the second output terminal with a reference value; and holding means for updating and holding the output of said comparison means in accordance with the output of said synchronism detection means, and for supplying the resultant output to said second switching means as a control signal.

18. A multi-output control power supply apparatus according to claim 17, further comprising delay means for delaying the control signal supplied from said holding means to said second switching means by a predetermined time period.

19. A multi-output control power supply apparatus according to claim 17, wherein the circuitry of said PWM control means, said synchronism detection means, and said holding means is formed on the same chip together with digital circuitry comprising a central processing unit, a read-only memory, a random access memory and the like, and analog circuitry comprising a digital-to-analog converter and the like.

* * * * *

UNITED STATES PATENT AND TRADEMARK OFFICE
CERTIFICATE OF CORRECTION

Page 1 of 3

PATENT NO. : 5,619,403
DATED : April 8, 1997
INVENTOR(S) : ISHIKAWA, et al.

It is certified that error appears in the above-indentified patent and that said Letters Patent is hereby corrected as shown below:

Column 1

Line 41, "a" should be deleted.

Column 6

Line 23, "to" should read --so--
Line 40, "30" should read --3.--.

Column 7

Line 42, "FIG. 2)," should read --FIG. 2).--.
Line 43, "transistor" should read --Transistor--.

Column 9

Line 32, "intelligenter" should read --intelligent--.

Column 10

Line 9, "b7" should read --by--.
Line 31, "IN" should read --In--.

Column 11

Line 7, "QI" should read --Q1--.

UNITED STATES PATENT AND TRADEMARK OFFICE
CERTIFICATE OF CORRECTION

PATENT NO. : 5,619,403
DATED : April 8, 1997
INVENTOR(S) : ISHIKAWA, et al.

It is certified that error appears in the above-indentified patent and that said Letters Patent is hereby corrected as shown below:

Column 12

Line 29, "VI" should read --V1--.
Line 50, "in" should read --is--.

Column 13

Line 64, "Cl" should read --C1--.

Column 14

Line 32, "based" should read --based on--.

Column 16

Line 20, "i" should read --1--.

Column 18

Line 13, "LS," should read --L5,--.
Line 14, "n4having" should read "n4 having--.
Line 18, "$\Delta i3=-[V1/LS]\times Ton2$." should read --$\Delta i3=[V1/L5]\times Ton2$.--.
Line 24, "$\Delta il=0$," should read --$\Delta i1=0$,".
Line 29, "$(\Delta il\times n4+\Delta i2\times n4+\Delta i3n5)$" should read
--$(\Delta i1\times n4+\Delta i2\times n4+\Delta i3\times n5)$--.

UNITED STATES PATENT AND TRADEMARK OFFICE
CERTIFICATE OF CORRECTION

PATENT NO. : 5,619,403
DATED : April 8, 1997
INVENTOR(S) : ISHIKAWA, et al.

It is certified that error appears in the above-indentified patent and that said Letters Patent is hereby corrected as shown below:

Column 19

Line 21, "$\Delta il=0$," should read --$\Delta i1=0$,--.
Line 29, "$\Delta il=0$," should read --$\Delta i1=0$,--.
Line 34, "$(\Delta il \times n4 + \Delta i2 \times n4 + \Delta i3n5)$" should read --$(\Delta i1 \times n4 + \Delta i2 \times n4 + \Delta i3 \times n5)$--.

Column 20

Line 5, "present1" should read --presently--.
Line 35, "voltage, resonant-type" should read --voltage-resonant-type--.

Signed and Sealed this

Fourth Day of November, 1997

Attest:

BRUCE LEHMAN

Attesting Officer

Commissioner of Patents and Trademarks